United States Patent
Murashi et al.

(10) Patent No.: US 11,646,452 B2
(45) Date of Patent: May 9, 2023

(54) SECONDARY BATTERY, BATTERY MODULE, VEHICLE, AND FLYING OBJECT

(71) Applicant: KABUSHIKI KAISHA TOSHIBA, Tokyo (JP)

(72) Inventors: Yasuaki Murashi, Kashiwazaki (JP); Masahiro Murata, Kashiwazaki (JP); Tatsuya Shinoda, Kashiwazaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 264 days.

(21) Appl. No.: 17/019,732

(22) Filed: Sep. 14, 2020

(65) Prior Publication Data
US 2020/0411910 A1    Dec. 31, 2020

Related U.S. Application Data

(63) Continuation of application No. PCT/JP2018/013047, filed on Mar. 28, 2018.

(51) Int. Cl.
*H01M 10/0587* (2010.01)
*H01M 50/147* (2021.01)
(Continued)

(52) U.S. Cl.
CPC ... *H01M 10/0587* (2013.01); *H01M 10/0431* (2013.01); *H01M 50/147* (2021.01);
(Continued)

(58) Field of Classification Search
CPC .............. H01M 50/10; H01M 10/052; H01M 10/0587; H01M 50/20; H01M 50/531;
(Continued)

(56) References Cited

U.S. PATENT DOCUMENTS

2011/0052976 A1*   3/2011   Ishii ................. H01M 10/0431
                                                                   429/178
2012/0077065 A1    3/2012   Kamiya et al.
(Continued)

FOREIGN PATENT DOCUMENTS

JP    2011-216403 A    10/2011
JP    2013-137991 A     7/2013
(Continued)

OTHER PUBLICATIONS

International Preliminary Report on Patentability and Written Opinion dated Oct. 8, 2020 in PCT/JP2018/013047 (submitting English translation only), 8 pages.
(Continued)

*Primary Examiner* — Jonathan G Jelsma
*Assistant Examiner* — Omar M Kekia
(74) *Attorney, Agent, or Firm* — Maier & Maier, PLLC

(57) ABSTRACT

A secondary battery according to an embodiment includes an exterior material including an opening portion and including a bottom, a wound electrode group housed in the exterior material in order for an insertion direction to be perpendicular to a winding axis, and a lid attached to the opening portion of the exterior material and including at least a plate-like member, a positive electrode terminal, and a negative electrode terminal. When a minimum distance between the lid and the wound electrode group is $A_{MIN}$, 0.5 mm $< A_{MIN} <$ 2.0 mm is satisfied.

12 Claims, 12 Drawing Sheets

(51) Int. Cl.
*H01M 10/04* (2006.01)
*H01M 50/224* (2021.01)
*H01M 50/124* (2021.01)
*H01M 50/553* (2021.01)
*H01M 50/209* (2021.01)
*H01M 50/103* (2021.01)
*H01M 50/55* (2021.01)
*H01M 50/15* (2021.01)
*H01M 50/271* (2021.01)
*H01M 50/536* (2021.01)
*H01M 50/231* (2021.01)
*H01M 50/171* (2021.01)
*H01M 50/543* (2021.01)
*H01M 50/10* (2021.01)
*H01M 50/531* (2021.01)
*H01M 50/20* (2021.01)

(52) U.S. Cl.
CPC .......... *H01M 50/10* (2021.01); *H01M 50/103* (2021.01); *H01M 50/1243* (2021.01); *H01M 50/15* (2021.01); *H01M 50/171* (2021.01); *H01M 50/20* (2021.01); *H01M 50/209* (2021.01); *H01M 50/224* (2021.01); *H01M 50/231* (2021.01); *H01M 50/271* (2021.01); *H01M 50/531* (2021.01); *H01M 50/536* (2021.01); *H01M 50/543* (2021.01); *H01M 50/55* (2021.01); *H01M 50/553* (2021.01); *H01M 2220/20* (2013.01); *Y02E 60/10* (2013.01); *Y02P 70/50* (2015.11)

(58) Field of Classification Search
CPC .......... H01M 10/0431; H01M 50/543; H01M 50/15; H01M 50/231; H01M 50/55; H01M 50/553; H01M 50/147; H01M 50/171; H01M 2220/20; H01M 50/271; H01M 50/224; H01M 50/103; H01M 50/209; H01M 50/536; H01M 50/1243; Y02P 70/50; Y02E 60/10

USPC ........................................................ 429/209
See application file for complete search history.

(56) References Cited

U.S. PATENT DOCUMENTS

| | | | |
|---|---|---|---|
| 2013/0136976 A1 | 5/2013 | Masuda et al. | |
| 2016/0126586 A1* | 5/2016 | Kobayashi | H01M 50/10 29/623.5 |
| 2016/0293928 A1 | 10/2016 | Wakimoto et al. | |
| 2016/0322626 A1 | 11/2016 | Okuda et al. | |
| 2018/0053971 A1* | 2/2018 | Matsui | H01M 10/44 |
| 2018/0062132 A1* | 3/2018 | Ono | H01G 11/82 |
| 2018/0269537 A1* | 9/2018 | Yoshima | H01M 4/02 |
| 2020/0220157 A1* | 7/2020 | Toshiro | H01M 4/139 |

FOREIGN PATENT DOCUMENTS

| | | |
|---|---|---|
| JP | 2013-168239 A | 8/2013 |
| JP | 2014-007767 A | 1/2014 |
| JP | 2018-032605 A | 3/2018 |
| WO | WO 2015/098955 A1 | 7/2015 |

OTHER PUBLICATIONS

Notice of Reasons for Refusal dated Sep. 7, 2021 in Japanese Patent Application No. 2020-508680 (with English machine translation), 5 pages.
European Search Report dated Nov. 4, 2021 in European Patent Application No. 18911589.2, 7 pages.
Japanese Office Action dated Jun. 15, 2021 in Japanese Patent Application No. 2020-508680 (with English translation), 8 pages.
International Search Report dated Jun. 19, 2018 in PCT/JP2018/013047 filed on Mar. 28, 2018, 2 pages.
Indian Examination Report dated Jan. 25, 2021 in Indian Patent Application No. 202017039186, 7 pages.

* cited by examiner

SECONDARY BATTERY, BATTERY MODULE, VEHICLE, AND FLYING OBJECT

CROSS-REFERENCE TO RELATED APPLICATION

This application is a continuation application based upon and claims the benefit of priority from International Application PCT/JP2018/013047, the International Filing Date of which is Mar. 28, 2018 the entire contents of which are incorporated herein by reference.

FIELD

Embodiments described herein relate generally to a secondary battery, a battery module, a vehicle, and a flying object.

BACKGROUND

In recent years, to improve the fuel efficiency of an automobile, a storage battery system has been constructed by connecting a 12V lead storage battery and a lithium-ion secondary battery in parallel, and a system that exhibits higher input/output characteristics than a conventional lead storage battery system has been developed. By installing such a power storage system in an automobile, for example, it is expected to generate power with use of regeneration energy and to discharge high current required to restart an engine after idling stop. A secondary battery for an automobile is required to have a structure enabling the battery to withstand vibration while the automobile is moving.

DETAILED DESCRIPTION

Figure 1:
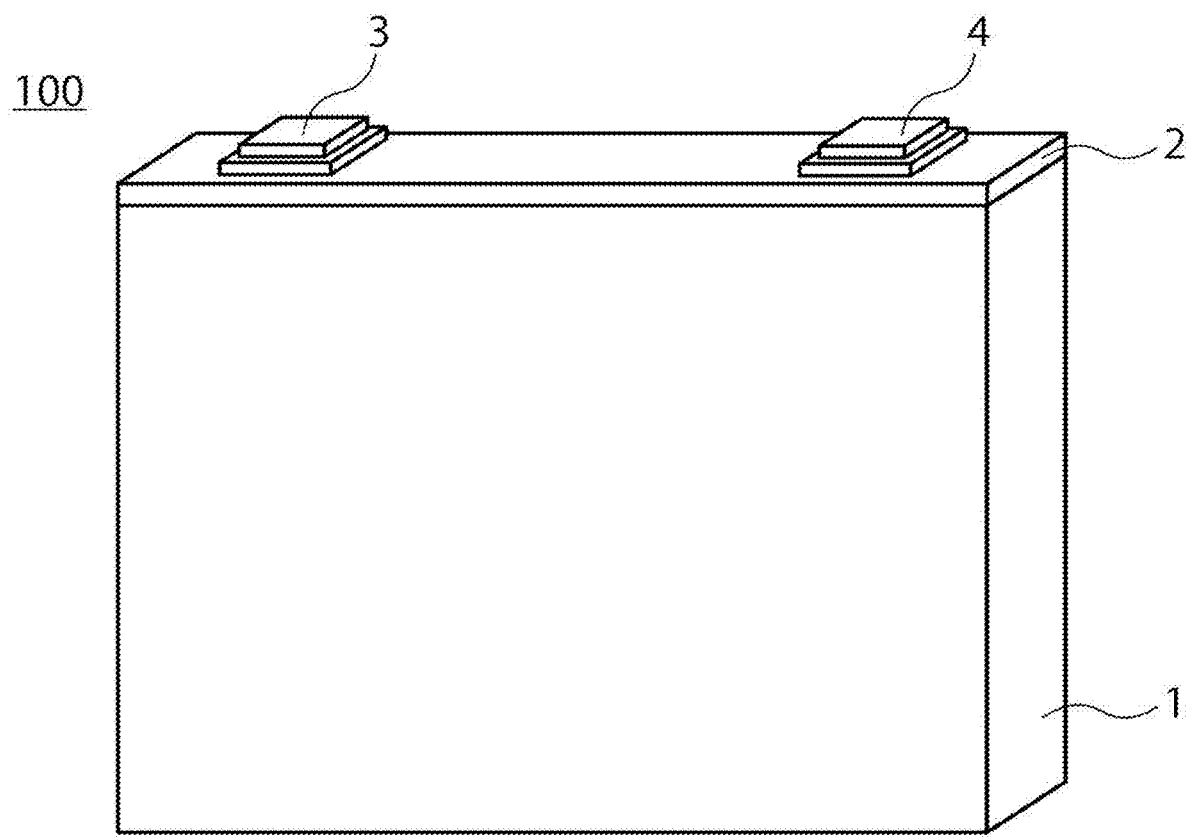
FIG. 1 is a schematic perspective view of a secondary battery according to a first embodiment.

A secondary battery according to an embodiment includes an exterior material including an opening portion and including a bottom, a wound electrode group housed in the exterior material in order for an insertion direction to be perpendicular to a winding axis, and a lid attached to the opening portion of the exterior material and including at least a plate-like member, a positive electrode terminal, and a negative electrode terminal. When a minimum distance between the lid and the wound electrode group is $A_{MIN}$, 0.5 mm<$A_{MIN}$<2.0 mm is satisfied.

Hereinbelow, embodiments will be described with reference to the drawings. Note that, in the following description, components having identical or similar functions are labeled with the same reference signs in all of the drawings, and description of the duplicate components is omitted. Note that each of the drawings is a schematic view for description of the embodiment and facilitation of understanding of the embodiment, and that the shape, dimensions, ratio, and the like of a device in the drawing differ from those of an actual device in several respects. However, the design of the device can arbitrarily be changed with reference to the following description and known techniques.

First Embodiment

Figure 2:
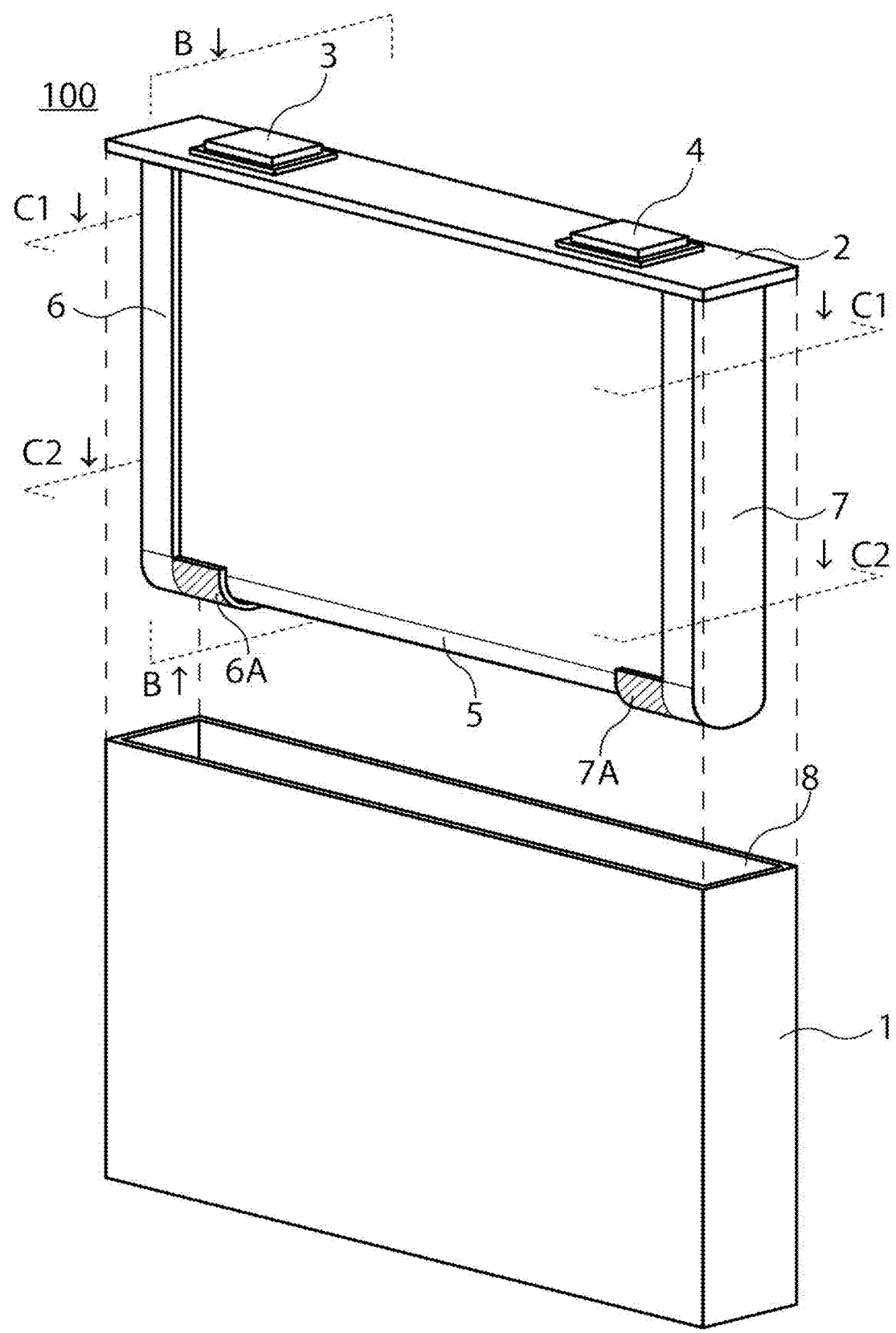
FIG. 2 is a schematic exploded perspective view of the secondary battery according to the first embodiment.
Figure 3:
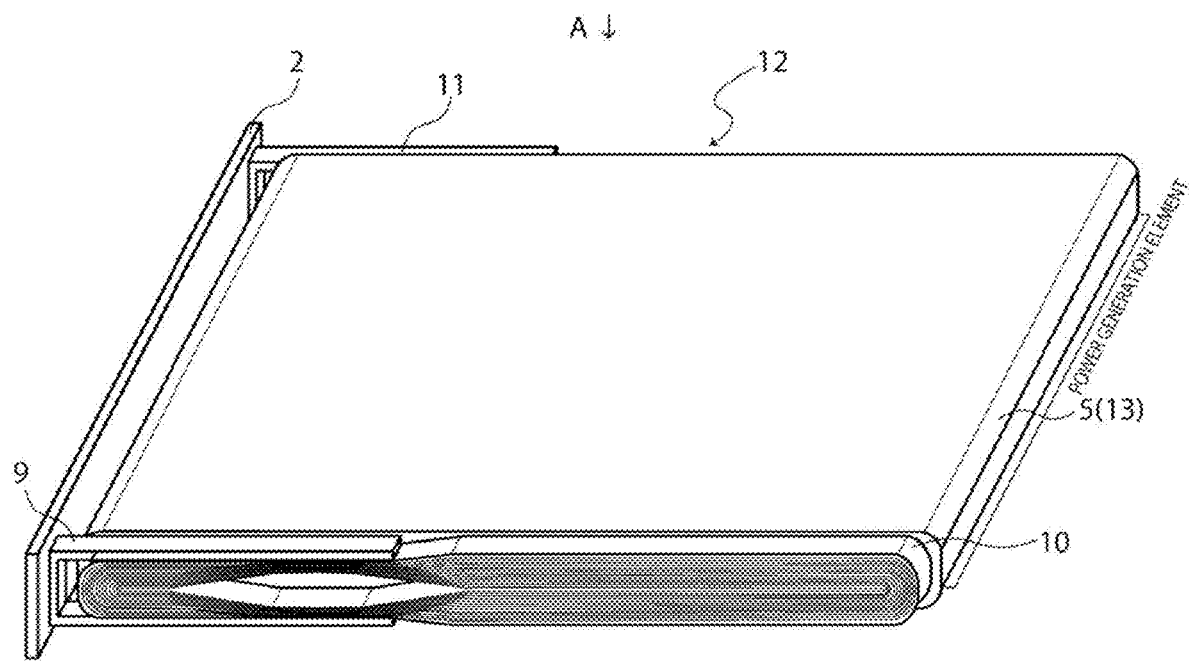
FIG. 3 is a schematic perspective view illustrating a part of the secondary battery according to the first embodiment.
Figure 4:
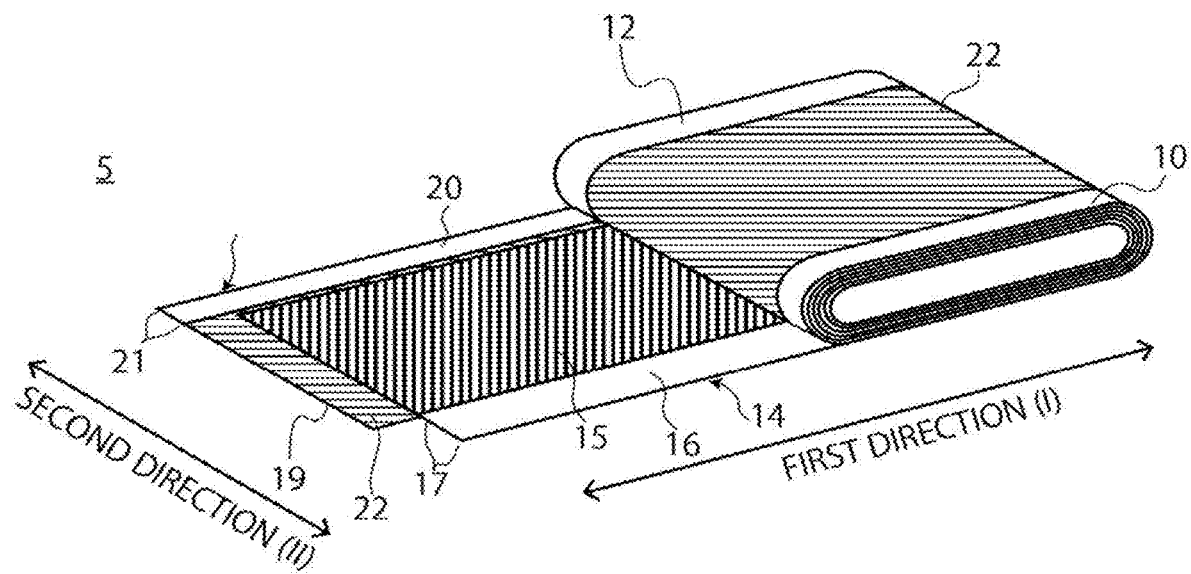
FIG. 4 is a schematic development view of a wound electrode group according to the first embodiment.

A first embodiment relates to a secondary battery. FIG. 1 is a schematic perspective view of a secondary battery 100 according to the first embodiment. The schematic view in FIG. 1 illustrates an outside of the secondary battery 100. FIG. 2 is a schematic exploded perspective view of the secondary battery 100 according to the first embodiment. FIG. 3 is an exploded view of a wound electrode group 5 according to the first embodiment. FIG. 4 is a perspective view of a part of the secondary battery 100 according to the first embodiment. The secondary battery 100 illustrated in FIGS. 1 to 4 includes an exterior material 1, a lid 2, a positive electrode terminal 3, a negative electrode terminal 4, the wound electrode group 5, a positive electrode side internal insulating part 6, a negative electrode side internal insulating part 7, a positive electrode lead 9, and a negative electrode lead 11. A not-illustrated electrolyte is contained inside the secondary battery 100. The secondary battery 100 is in a rectangular shape.

The exterior material 1 has an opening portion 8. The exterior material 1 is formed in a rectangular shape and has a bottom on the opposite side of the opening portion 8. A metal container or a laminated film can be used for the exterior material 1. The opening portion 8 of the exterior material 1 is welded or bonded to the lid 2.

Aluminum, an aluminum alloy, iron, stainless steel, or the like can be used for the metal container. The thickness of the metal container is preferably equal to or less than 0.5 mm, for example.

As the laminated film, a multilayer film with a metal layer interposed between resin films can be used. The metal layer is preferably aluminum foil or aluminum alloy foil for weight reduction. For the resin film, a polymer material such as polypropylene (PP), polyethylene (PE), nylon, and polyethylene terephthalate (PET) can be used. The laminated film can be formed into the shape of the exterior material by performing sealing by mean of heat fusion. The thickness of the laminated film is preferably equal to or less than 0.2 mm, for example.

The lid 2 is attached to the opening portion 8 of the exterior material 1 and includes at least a plate-like member, the positive electrode terminal 3, and the negative electrode terminal 4. The positive electrode terminal and the negative electrode terminal are provided on the plate-like member of the lid 2. A surface of the lid 2 facing the wound electrode group 5 may include an insulating layer 2A. The insulating layer 2A includes an insulating material that electrically insulates a member included in the lid such as the plate-like member of the lid 2 from another arbitrary member. In the insulating layer 2A of the lid 2, the positive electrode terminal 3 and the positive electrode lead 9 are connected, and the negative electrode terminal 4 and the negative electrode lead 11 are connected, for example. The insulating layer may include a protection circuit that can detect an abnormality and the like in the secondary battery. The lid 2 may further be provided with a safety valve and an electrolyte inlet. The lid 2 is welded or bonded to the exterior material 1 so that the plate-like member of the lid 2 may cover the opening portion 8 of the exterior material 1.

For the plate-like member holding the positive electrode terminal 3 and the negative electrode terminal 4 of the lid 2, a metal material such as aluminum, an aluminum alloy, iron, and stainless steel or a polymer material such as polypropylene (PP), polyethylene (PE), nylon, and polyethylene terephthalate (PET) can be used. The plate-like member holding the positive electrode terminal 3 and the negative electrode terminal 4 of the lid 2 and the exterior material 1 are preferably made of the same kind of material. The thickness of the plate-like member holding the positive electrode terminal 3 and the negative electrode terminal 4 of the lid 2 is preferably equal to or less than 0.5 mm, for example.

The positive electrode terminal 3 is an electrode terminal electrically connected to a positive electrode of the wound electrode group 5. The positive electrode terminal 3 is provided with a gasket and is insulated from the plate-like member of the lid 2.

The negative electrode terminal 4 is an electrode terminal electrically connected to a negative electrode of the wound electrode group 5. The negative electrode terminal 4 is provided with a gasket and is insulated from the plate-like member of the lid 2.

The wound electrode group 5 includes a power generation element and an electrode tab and is housed in the exterior material 1. The wound electrode group 5 is housed in the exterior material 1 in order for an insertion direction thereof to be perpendicular to a winding axis thereof. FIG. 3 is a schematic perspective view of a part of the secondary battery 100. In the perspective view in FIG. 3, the wound electrode group 5, the positive electrode lead 9, and the negative electrode lead 11 are illustrated. The wound electrode group 5 includes a power generation element at the center, a positive electrode current collector tab 10 at a first end, and a negative electrode current collector tab 12 at a second end. The power generation element is arranged between the positive electrode current collector tab 10 and the negative electrode current collector tab 12. A positive electrode current collector is wound to form the positive electrode current collector tab 10. Also, a negative electrode current collector is wound to form the negative electrode current collector tab 12. The outermost periphery of the power generation element of the wound electrode group 5 is wound with an insulating film 13.

The positive electrode lead 9 is an electrically conductive member electrically connected to the positive electrode terminal 3 and the positive electrode current collector tab 10. For example, the positive electrode lead 9 is welded to the positive electrode current collector tab 10 to cause the positive electrode lead 9 and the positive electrode current collector tab 10 to be electrically connected. A not-illustrated positive electrode backup lead may be provided between the positive electrode lead 9 and the positive electrode current collector tab 10. The positive electrode lead 9 is covered with the positive electrode side internal insulating part 6. The positive electrode lead 9 is insulated from the plate-like member of the lid 2 by the insulating layer 2A made of an insulating material, for example. A not-illustrated insulating material may be provided between the plate-like member of the lid 2 and the positive electrode lead 9. Also, the plate-like member of the lid 2 and the positive electrode lead 9 may be insulated by the gasket of the positive electrode terminal 3. In a case in which the plate-like member of the lid 2 is made of an insulating material, the insulating method is not limited to these methods.

The negative electrode lead 11 is an electrically conductive member electrically connected to the negative electrode terminal 4 and the negative electrode current collector tab 12. For example, the negative electrode lead 11 is welded to the negative electrode current collector tab 12 to cause the negative electrode lead 11 and the negative electrode current collector tab 12 to be electrically connected. A not-illustrated negative electrode backup lead may be provided between the negative electrode lead 11 and the negative electrode current collector tab 12. The negative electrode lead 11 is covered with the negative electrode side internal insulating part 7. The negative electrode lead 11 is insulated from the plate-like member of the lid 2 by the insulating layer 2A made of an insulating material, for example. A not-illustrated insulating material may be provided between the plate-like member of the lid 2 and the negative electrode lead 11. Also, the plate-like member of the lid 2 and the negative electrode lead 11 may be insulated by the gasket of the negative electrode terminal 4. In a case in which the plate-like member of the lid 2 is made of an insulating material, the insulating method is not limited to these methods.

For the electrolyte, a solution containing an electrolyte salt and a non-aqueous solvent, a non-aqueous gel electrolyte obtained by mixing a polymer material with a solution containing an electrolyte salt and a non-aqueous solvent, a solution containing an electrolyte salt and water, or an aqueous gel electrolyte obtained by mixing a polymer material with a solution containing an electrolyte salt and water is preferably used.

For the electrolyte salt contained in the non-aqueous solution, a lithium salt can be used such as $LiPF_6$, $LiBF_4$, $Li(CF_3SO_2)_2N$ (bistrifluoromethanesulfonylamide lithium; commonly known as LiTFSI), $LiCF_3SO_3$ (commonly known as LiTFS), $Li(C_2F_bSO_2)_2N$ (bispentafluoroethanesulfonylamide lithium; commonly known as LiBETI), $LiClO_4$, $LiAsF_6$, $LiSbF_6$, $LiB(C_2O_4)_2$ (lithium bisoxalatoborate; commonly known as LiBOB), difluoro(trifluoro-2-oxide-2-trifluoro-methylpropionato(2-)-0,0), and $LiBF_2OCOOC(CF_3)_2$ (lithium borate; commonly known as $LiBF_2$(HHIB)). These electrolyte salts may be used alone or in combination of two or more. $LiPF_6$ and $LiBF_4$ are particularly preferable. An ion-conductive supporting salt can be used for the lithium salt. Examples thereof include lithium hexafluorophosphate ($LiPF_6$), lithium tetrafluoroborate, and an imide-based supporting salt. One kind or two or more kinds of lithium salt may be contained.

The concentration of the non-aqueous electrolyte salt is preferably equal to or more than 0.5 mol/L and equal to or less than 3 mol/L, and more preferably equal to or more than 0.7 mol/L and equal to or less than 2 mol/L. By defining the electrolyte concentration in this manner, it is possible to further improve the performance when high load current flows while suppressing an influence of a viscosity increase due to an increase in electrolyte salt concentration.

The non-aqueous solvent is not particularly limited, and examples thereof that can be used are cyclic carbonate such as propylene carbonate (PC) and ethylene carbonate (EC), chain carbonate such as diethyl carbonate (DEC), dimethyl carbonate (DMC), methyl ethyl carbonate (MEC), and dipropyl carbonate (DPC), 1,2-dimethoxyethane (DME), γ-butyrolactone (GBL), tetrahydrofuran (THF), 2-methyltetrahydrofuran (2-MeHF), 1,3-dioxolane, sulfolane, and acetonitrile (AN). These solvents may be used alone or in combination of two or more. The non-aqueous solvent containing cyclic carbonate and/or chain carbonate is preferable. Examples of the polymer material contained in the non-aqueous gel electrolyte include polyvinylidene fluoride (PVdF), polyacrylonitrile (PAN), polyethylene oxide (PEO), and polymethacrylate.

Examples of the electrolyte salt contained in the aqueous solution include LiCl, LiBr, LiOH, $Li_2SO_4$, $LiNO_3$, $LiN(SO_2CF_3)_2$ (lithium trifluoromethanesulfonylamide; commonly known as LiTFSA), $LiN(SO_2C_2F_5)_2$ (lithium bispentafluoroethanesulfonylamide; commonly known as LiBETA), $LiN(SO_2F)_2$ (lithium bisfluorosulfonylamide; commonly known as LiFSA), and $LiB[(OCO)_2]_2$. One kind or two or more kinds of lithium salt can be used. Examples of the polymer material contained in the aqueous gel electrolyte include polyvinylidene fluoride (PVdF), polyacrylonitrile (PAN), polyethylene oxide (PEO), and polymethacrylate.

The concentration of the aqueous electrolyte salt is preferably equal to or more than 1 mol/L and equal to or less than 12 mol/L, and more preferably equal to or more than 2 mol/L and equal to or less than 10 mol/L. To suppress electrolysis of the electrolytic solution, LiOH or $Li_2SO_4$ can be added to adjust the pH. The pH value is preferably equal to or more than 3 and equal to or less than 13, and more preferably equal to or more than 4 and equal to or less than 12.

FIG. 4 is a schematic development view of the wound electrode group 5 before being welded to the leads. FIG. 4 is a schematic view of the wound electrode group 5 unwound in a first direction (I). A second direction (II) in FIG. 4 is a width direction of the wound electrode group 5, and the positive electrode current collector tab 10, the power generation element, and the negative electrode current collector tab 12 are arranged in the second direction (II). The power generation element is a portion in which a positive electrode 14, a separator 22, and a negative electrode 18 are laminated and which can charge and discharge electric energy. In the description of the embodiment, a portion of the wound electrode group 5 excluding the insulating film 13, the positive electrode current collector tab 10, and the negative electrode current collector tab 12 is the power generation element.

The wound electrode group 5 includes the positive electrode 14, the separator 22, the negative electrode 18, and the insulating film. In the wound electrode group 5, a positive electrode current collector 16, a positive electrode active material layer 15, the separator 22, a negative electrode active material layer 19, and a negative electrode current collector 20 are at least laminated in this order and wound. The positive electrode 14 includes the positive electrode active material layer 15 and the positive electrode current collector 16. The positive electrode active material layer is provided on one surface or both surfaces of the positive electrode current collector 16. The negative electrode 18 includes the negative electrode active material layer 19 and the negative electrode current collector 20. The negative electrode active material layer 19 is provided on one surface or both surfaces of the negative electrode current collector 20. In FIG. 4, the negative electrode active material layer 19 overlaps with another layer or is on the back surface of the negative electrode current collector 20. The separator 22 is provided between the positive electrode active material layer 15 and the negative electrode active material layer 19. The positive electrode current collector tab 10 is a wound portion of a non-coated portion 17 of the positive electrode current collector 16 provided with no positive electrode active material layer 15. The negative electrode current collector tab 12 is a wound portion of a non-coated portion 21 of the negative electrode current collector 20 provided with no negative electrode active material layer 19.

Since the wound electrode group 5 is wound, the positive electrode active material layer 15, the positive electrode current collector 16, the positive electrode active material layer 15, the separator 22, the negative electrode active material layer 19, the negative electrode current collector 20, the negative electrode active material layer 19, and the separator 22 are repetitively laminated in this order.

The positive electrode active material layer 15 is a mixture layer containing a positive electrode active material, a binder and a conductive agent. Preferably, as for the mixing ratio of the positive electrode active material, the conductive agent, and the binder in the positive electrode active material layer 15, the ratio of the positive electrode active material is equal to or more than 70 mass % and equal to or less than 96 mass %, the ratio of the conductive agent is equal to or more than 3 mass % and equal to or less than 17 mass %, and the ratio of the positive electrode binder is equal to or more than 1 mass % and equal to or less than 13 mass %. The positive electrode active material layer 15 may contain an additive in addition to these materials.

Examples of the positive electrode active material that can obtain a high positive electrode potential will be described below. The examples include lithium manganese composite oxide such as $Li_xMn_2O_4$ ($0<x\leq1$) and $Li_xMnO_2$ ($0<x\leq1$) having spinel structure, lithium nickel aluminum composite oxide such as $Li_xNi_{1-y}Al_yO_2$ ($0<x\leq1$, $0<y\leq1$), lithium cobalt composite oxide such as $Li_xCoO_2$ ($0<x\leq1$), lithium nickel cobalt composite oxide such as $Li_xNi_{1-y-z}Co_yMn_zO_2$ ($0<x\leq1$, $0<y\leq1$, $0\leq z\leq1$), lithium manganese cobalt composite oxide such as $Li_xMn_yCo_{1-y}O_2$ ($0<x\leq1$, $0<y\leq1$), spinel type lithium manganese nickel composite oxide such as $Li_xMn_{2-z}Ni_yO_4$ ($0<x\leq1$, $0<y<2$), a lithium phosphorylated material having olivine structure such as $Li_xFePO_4$ ($0<x\leq1$), $Li_xFe_{1-y}Mn_yPO_4$ ($0<x\leq1$, $0\leq y\leq1$), and $Li_xCoPO_4$ ($0<x\leq1$), and fluorinated iron sulfate (for example, $Li_xFeSO_4F$ ($0<x\leq1$)).

The particles of the positive electrode active material may be single primary particles, secondary particles that are aggregates of the primary particles, or particles that include both the single primary particles and the secondary particles. The average particle diameter (diameter) of the primary particles of the positive electrode active material is preferably equal to or less than 10 μm, and more preferably equal to or more than 0.1 μm and equal to or less than 5 μm. The average particle diameter (diameter) of the secondary particles of the positive electrode active material is preferably equal to or less than 100 μm, and more preferably equal to or more than 10 μm and equal to or less than 50 μm.

At least a part of the particle surface of the positive electrode active material may be covered with a carbon material. The carbon material may be in a layer structure, in a particle structure, or in the form of an aggregate of particles.

The binder for binding the active material to the conductive agent contains polytetrafluoroethylene (PTFE), polyvinylidene fluoride (PVdF), fluorine rubber, ethylene-butadiene rubber (SBR), polypropylene (PP), polyethylene (PE), carboxymethyl cellulose (CMC), polyimide (PI), polyacrylimide (PAI), modified PVdF in which at least one out of hydrogen and fluorine in PVdF is substituted with another substituent, a vinylidene fluoride-propylene hexafluoride copolymer, a polyvinylidene fluoride-tetrafluoroethylene-propylene hexafluoride ternary copolymer, and an acrylic resin, for example. One kind or two or more kinds of binder can be used.

As the conductive agent for increasing electron conductivity of the positive electrode active material layer 15 and suppressing contact resistance with the positive electrode current collector 16, acetylene black, carbon black, graphite, and carbon fiber having an average fiber diameter of 1 μm or less can be raised as examples. One kind or two or more kinds of conductive agent can be used.

The positive electrode current collector 16 is a conductive thin film in contact with the positive electrode active material layer 15. As the positive electrode current collector, foil, a porous body, or a mesh made of metal such as stainless steel, Al, Ti, and Cu is preferably used. To prevent corrosion of the positive electrode current collector 16 due to a reaction between the positive electrode current collector 16 and the electrolyte (solution), the surface of the positive electrode current collector 16 may be coated with a different element. The thickness of the positive electrode current collector 16 is typically preferably equal to or more than 5 μm and equal to or less than 20 μm.

The positive electrode 14 can be manufactured in the following manner, for example. First, the positive electrode active material, the conductive agent, and the binder are dispersed in an appropriate solvent to prepare a slurry. The slurry is applied to the positive electrode current collector 16, and the applied film is dried, to form the positive electrode active material layer 15 on the positive electrode current collector 16. At this time, the non-coated portion is provided in the longitudinal direction at the end of the positive electrode current collector 16 for the positive electrode current collector tab 10. Here, for example, the slurry may be applied to one surface of the positive electrode current collector 16 or to both one surface and the back surface of the current collector. Subsequently, the positive electrode current collector 16 and the positive electrode active material layer 15 are pressed by means of heating press, for example, to enable the positive electrode 14 to be manufactured.

The negative electrode active material layer 19 is a mixture layer containing a negative electrode active material, a binder and a conductive agent. Preferably, in the negative electrode active material layer 19, the ratio of the negative electrode active material is equal to or more than 70 mass % and equal to or less than 96 mass %, the ratio of the conductive agent is equal to or more than 2 mass % and equal to or less than 20 mass %, and the ratio of the negative electrode binder is equal to or more than 2 mass % and equal to or less than 10 mass %. By setting the amount of the conductive agent to 2 mass % or more, the current collecting performance of the negative electrode mixture layer can be improved. Also, by setting the amount of the negative electrode binder to 2 mass % or more, the binding property between the negative electrode mixture layer and the negative electrode current collector can be enhanced, and excellent cycle characteristics can be expected. On the other hand, the ratio of each of the conductive agent and the binder is preferably equal to or less than 28 mass % to increase the capacity. The negative electrode active material layer 19 may contain an additive in addition to these materials.

The negative electrode active material is not particularly limited. Examples of the negative electrode active material include a graphite material or a carbonaceous material (for example, graphite, coke, carbon fiber, spherical carbon, a pyrolytic vapor carbonaceous material, and a resin fired body), a chalcogen compound (for example, titanium disulfide, molybdenum disulfide, and niobium selenide), a light metal (for example, aluminum, an aluminum alloy, a magnesium alloy, lithium, and a lithium alloy), spinel type lithium titanate represented by $Li_{4+x}Ti_5O_{12}$ (x changes in the range of $-1 \leq x \leq 3$ due to a charge/discharge reaction), ramsdellite type $Li_{2+x}Ti_3O_7$ (x changes in the range of $-1 \leq x \leq 3$ due to a charge/discharge reaction), metal composite oxide containing Ti and at least one element selected from the group consisting of P, V, Sn, Cu, Ni, and Fe, and niobium titanium composite oxide.

As the metal composite oxide containing Ti and at least one element selected from the group consisting of P, V, Sn, Cu, Ni, and Fe, $TiO_2$—$P_2O_5$, $TiO_2$—$V_2O_5$, $TiO_2$—$P_2O_5$—$SnO_2$, and $TiO_2$—$P_2O_5$—MO (M is at least one element selected from the group consisting of Cu, Ni, and Fe) can be raised as examples. Each of these metal composite oxide materials changes into lithium titanium composite oxide when lithium is inserted by means of charging. The lithium titanium oxide (for example, spinel type lithium titanate) preferably contains at least one substance selected from the group consisting of silicon, tin, and the like. The binder of the negative electrode active material layer 19 is the same as the binder of the positive electrode active material layer 15. The conductive agent of the negative electrode active material layer 19 is the same as the conductive agent of the positive electrode active material layer 15.

Examples of the niobium titanium-containing composite oxide include composite oxide having a monoclinic crystal structure represented by a general formula $Li_aTiM_bNb_{2\pm\beta}O_{7\pm\sigma}$ (where the values of the respective subscripts are in the ranges of $0 \leq a \leq 5$, $0 \leq b \leq 0.3$, $0 \leq \beta \leq 0.3$, and $0 \leq \sigma \leq 0.3$, and where M is at least one kind selected from the group consisting of Fe, V, Mo, and Ta (one kind or plural kinds may be selected)) and composite oxide having an orthorhombic crystal structure represented by a general formula $Li_{2+a1}M(I)_{2-b1}Ti_{6-c1}M(II)_{d1}O_{14+\sigma 1}$ (where the values of the respective subscripts are in the ranges of $0 \leq a1 \leq 6$, $0 < b1 < 2$, $0 < c1 < 6$, $0 < d1 < 6$, and $-0.5 \leq \sigma 1 \leq 0.5$, where M(I) is at least one kind selected from the group consisting of Sr, Ba, Ca, Mg, Na, Cs, and K (one kind or plural kinds may be selected), and where M(II) is at least one kind selected from the group consisting of Zr, Sn, V, Nb, Ta, Mo, W, Fe, Co, Mn, and Al (one kind or plural kinds may be selected) and contains Nb). Preferably, in the above general formula $Li_{2+a1}M(I)_{2-b1}Ti_{6-c1}M(II)_{d1}O_{14+\sigma 1}$, the values of the respective subscripts are in the ranges of $0 \leq a1 \leq 6$, $0 < b1 < 2$, $0 < c1 < 6$, $0 < d1 < 6$, and $-0.5 \leq \sigma 1 \leq 0.5$, M(I) is at least one kind selected from the group consisting of Sr, Ba, Ca, Mg, Na, Cs, and K (one kind or plural kinds may be selected), and M(II) is Nb or a combination of Nb and at least one kind selected from the group consisting of Zr, Sn, V, Ta, Mo, W, Fe, Co, Mn, and Al (one kind or plural kinds may be selected). In particular, the monoclinic niobium titanium-containing composite oxide is more preferable because the composite oxide has a large capacity per weight and can increase a battery capacity.

The negative electrode current collector 20 can be a metal such as Al, Ti, and Cu or an alloy consisting primarily of the above metal and having added thereto one or more elements selected from the group consisting of Zn, Mn, Fe, Cu, and Si, for example. In particular, aluminum alloy foil consisting primarily of Al is preferable because the foil is flexible and is excellent in formability. The negative electrode current collector 20 containing a zinc element is also preferable. Here, the form of the zinc element contained in the negative electrode current collector 20 includes zinc as a single body (metal zinc), a compound containing zinc, and a zinc alloy. The thickness of the negative electrode current collector 20 is typically preferably equal to or more than 5 μm and equal to or less than 20 μm.

The separator 22 is a porous thin insulating thin film. The separator 22 includes a non-woven fabric, a film, paper, an inorganic particle layer, and the like. Examples of the constituent material of the separator include polyolefin such as polyethylene and polypropylene, cellulose, polyester, polyvinyl alcohol, polyimide, polyamide, polyamideimide, polytetrafluoroethylene, and vinylon. An example of the preferable separator from the viewpoint of thinness and mechanical strength is a non-woven fabric containing cellulose fiber. The inorganic particle layer contains oxide particles, a thickener, and a binder. For the oxide particles, metal oxide such as aluminum oxide, titanium oxide, magnesium oxide, zinc oxide, and barium sulfate can be used. For the thickener, carboxymethyl cellulose can be used. For the binder, methyl acrylate, an acrylic copolymer containing the methyl acrylate, styrene-butadiene rubber (SBR), or the like can be used. For the insulating film 13, as well as for the separator 22, a non-woven fabric, a film, or paper may be used. The insulating film 13 is preferably further secured with a not-illustrated tape.

The positive electrode current collector tab 10 is a portion in which the positive electrode current collector 16 is wound. The positive electrode current collector tab 10 is formed by laminating the non-coated portion 17 of the positive electrode current collector 16 on which the slurry forming the positive electrode active material layer 15 is not applied. The positive electrode current collector tab 10 is welded to the positive electrode lead 9. The positive electrode current collector tab 10 is electrically connected to the positive electrode lead 9 and the positive electrode terminal 3. The positive electrode current collector tab 10 is covered with the positive electrode side internal insulating part 6.

The negative electrode current collector tab 12 is a portion in which the negative electrode current collector 20 is wound. The negative electrode current collector tab 12 is formed by laminating the non-coated portion 21 of the negative electrode current collector 20 on which the slurry forming the negative electrode active material layer 19 is not applied. The negative electrode current collector tab 12 is welded to the negative electrode lead 11. The negative electrode current collector tab 12 is electrically connected to the negative electrode lead 11 and the negative electrode terminal 4. The negative electrode current collector tab 12 is covered with the negative electrode side internal insulating part 7.

The positive electrode side internal insulating part 6 is an insulating member that covers the positive electrode current collector tab 10, the positive electrode lead 9, and at least a part of the wound electrode group 5 on the bottom side of the exterior material 1. The positive electrode side internal insulating part 6 includes an extending portion 6A extending in a direction of the negative electrode side internal insulating part 7 (extending portion 7A) on the bottom side of the exterior material. In FIG. 2, the extending portion 6A is shaded. The extending portion 6A of the positive electrode side internal insulating part 6 covers at least a part of the wound electrode group on the bottom side of the exterior material 1. The positive electrode side internal insulating part 6 is in direct contact with the positive electrode lead 9 and preferably pinches the positive electrode lead 9. The positive electrode side internal insulating part 6 is preferably not in contact with the wound electrode group 5 including the positive electrode current collector tab 10.

The positive electrode side internal insulating part 6 is a member formed from an insulating resin or paper. A portion of the positive electrode side internal insulating part 6 excluding the extending portion 6A does not cover the region of the power generation element in which the positive electrode active material layer 15 and the negative electrode active material layer 19 are present. The extending portion 6A of the positive electrode side internal insulating part 6 covers at least a part of the wound electrode group 5 including the region of the power generation element in which the positive electrode active material layer 15 and the negative electrode active material layer 19 are present. On the bottom side of the exterior material 1, the exterior material 1, the extending portion 6A of the positive electrode side internal insulating part 6 (and the extending portion 7A of the negative electrode side internal insulating part 7), and the wound electrode group 5 are arranged in this order from the outside to the inside.

The negative electrode side internal insulating part 7 is an insulating member that covers the negative electrode current collector tab 12, the negative electrode lead 11, and at least a part of the wound electrode group 5 on the bottom side of the exterior material 1. The negative electrode side internal insulating part 7 includes an extending portion 7A extending in a direction of the positive electrode side internal insulating part 6 (extending portion 7A) on the bottom side of the exterior material. In FIG. 2, the extending portion 6A is shaded. The extending portion 7A of the negative electrode side internal insulating part 7 covers at least a part of the wound electrode group on the bottom side of the exterior material 1. The negative electrode side internal insulating part 7 is in direct contact with the negative electrode lead 11 and preferably pinches the negative electrode lead 11. The negative electrode side internal insulating part 7 is preferably not in contact with the wound electrode group 5 including the negative electrode current collector tab 12.

The negative electrode side internal insulating part 7 is a member formed from an insulating resin or paper. A portion of the negative electrode side internal insulating part 7 excluding the extending portion 7A does not cover the region of the power generation element in which the positive electrode active material layer 15 and the negative electrode active material layer 19 are present. The extending portion 7A of the negative electrode side internal insulating part 7 covers at least a part of the wound electrode group 5 including the region of the power generation element in which the positive electrode active material layer 15 and the negative electrode active material layer 19 are present. On the bottom side of the exterior material 1, the exterior material 1, the extending portion 7A of the negative electrode side internal insulating part 7 (and the extending portion 6A of the positive electrode side internal insulating part 6), and the wound electrode group 5 are arranged in this order from the outside to the inside.

Figure 5:
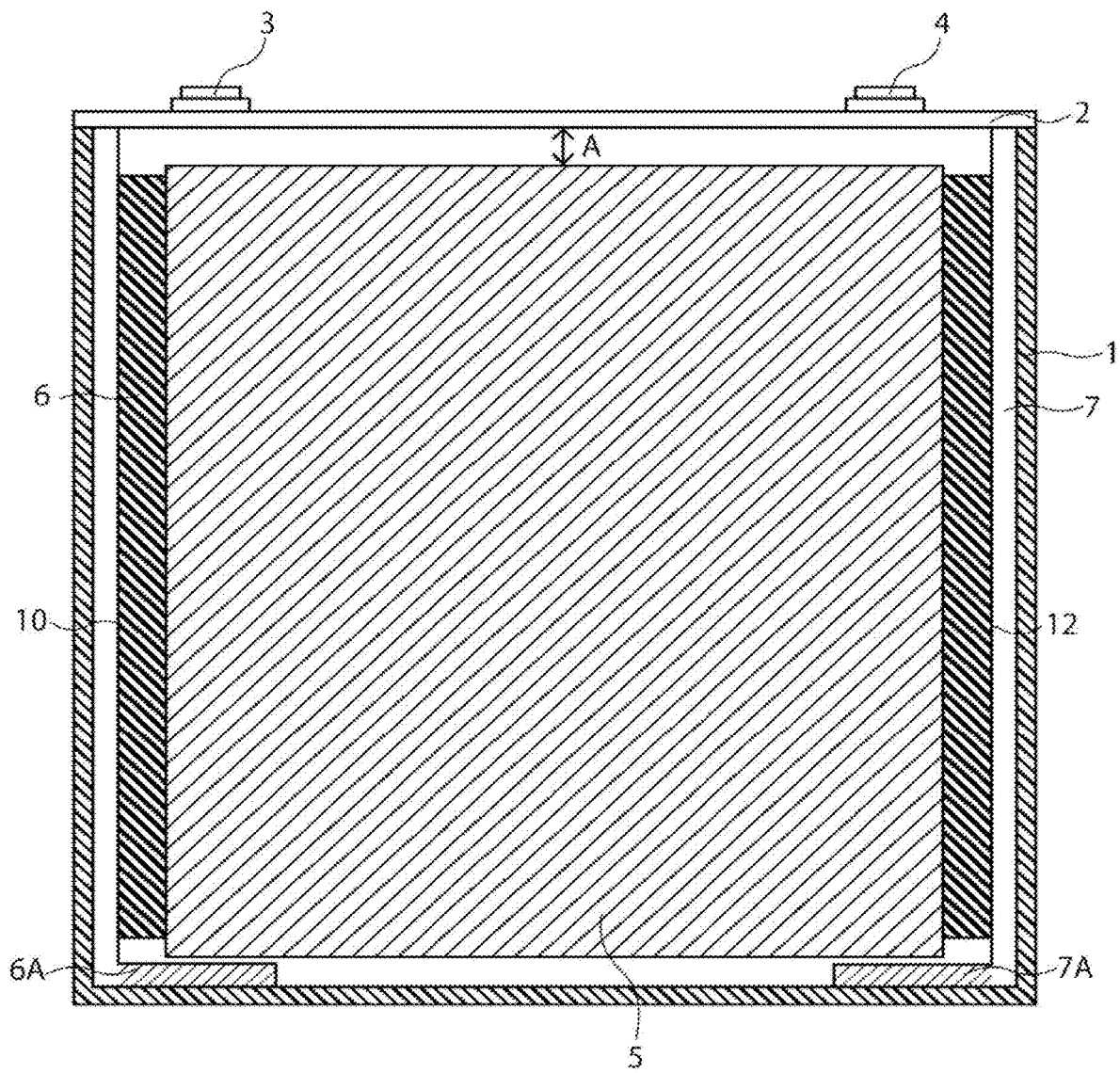
FIG. 5 is a partial schematic view of the secondary battery according to the first embodiment.

FIG. 5 is a partial schematic view of the secondary battery 100 as viewed in the direction A in the perspective view in FIG. 3. FIG. 5 illustrates a distance between the wound electrode group 5 and the lid 2. A distance A between the wound electrode group 5 and the lid 2 is a distance between a surface of the lid 2 facing the bottom side of the exterior material 1, that is, a surface of the plate-like member of the lid 2 facing the wound electrode group 5, and the wound electrode group 5. Here, when a minimum distance of the distance A is $A_{MIN}$, 0.5 mm<$A_{MIN}$ is preferably satisfied. Conventionally, the wound electrode group 5 and the lid 2 are positioned to be in contact with each other, and a lead connected to the lid 2 and the current collector tabs of the wound electrode group 5 are welded. However, in a case in which the lid 2 and the wound electrode group 5 are in contact with each other, the wound electrode group 5 and the lid 2 easily rub against each other even with a slight vibration. Also, in a case in which $A_{MIN}$ is equal to or less than 0.5 mm, the lid 2 and the wound electrode group 5 are likely to come into contact with each other even with a small vibration, and the wound electrode group 5 and the lid 2 are easily damaged, which is not preferable. Also, $A_{MIN}$ preferably satisfies $A_{MIN}$<2.0 mm. In a case in which $A_{MIN}$ is equal to or more than 2.0 mm, the wound electrode group 5 moves over a wide range at the time of a large vibration, and the wound electrode group 5 and the lid 2 are thus easily damaged, which is not preferable. When $A_{MIN}$ satisfies 0.5 mm<$A_{MIN}$<2.0 mm, the movable range of the wound electrode group 5 on a side provided with the lid 2 is neither narrow nor wide, and the possibility of damage of the wound electrode group 5 or the wound electrode group 5 and the lid 2 caused by a vibration can thus be reduced. For a similar reason, $A_{MIN}$ more preferably satisfies 0.5 mm<$A_{MIN}$<1.0 mm.

Also, when the average value of the distance A is $A_{AVE}$, 0.5 mm<$A_{AVE}$<2.0 mm is more preferably satisfied for the same reason as the above. Further, when the maximum distance of the distance A is $A_{MAX}$, $A_{MAX}$<2.0 mm is more preferably satisfied for the same reason as the above. That is, $A_{MIN}$ and $A_{AVE}$ preferably satisfy 0.5 mm<$A_{MIN}$ and 0.5 mm<$A_{AVE}$<2.0 mm, or $A_{MIN}$ and $A_{MAX}$ preferably satisfy 0.5 mm<$A_{MIN}$ and $A_{MAX}$<2.0 mm. $A_{MIN}$, $A_{AVE}$, and $A_{MAX}$ more preferably satisfy 0.5 mm<$A_{MIN}$, 0.5 mm<$A_{AVE}$<2.0 mm, and $A_{MAX}$<2.0 mm.

The distance A is derived from a cross-sectional image as illustrated in the schematic view in FIG. 5. The secondary battery 100 is subjected to a computed tomography (CT) inspection with use of X-rays. An image of a cross section of the central part of the wound electrode group 5 in the thickness direction is captured. On the captured image, the distance A between the lid 2 and the wound electrode group 5 is measured at 5-mm intervals in the width direction of the drawing (the second direction (II) of the wound electrode group 5). For example, when twenty distances A are derived at 5-mm intervals, the respective distances A are distances $A_1$ to $A_{20}$. Among the measured distances, a minimum distance, a maximum distance, and an average distance are derived. In a case in which the fifth distance $A_5$ is the minimum distance value, the distance $A_5$ is $A_{MIN}$. Also, in a case in which the twelfth distance $A_{12}$ is the maximum distance value, the distance $A_{12}$ is $A_{MAX}$. The average value of the distances $A_1$ to $A_{20}$ is $A_{AVE}$.

Figure 6:
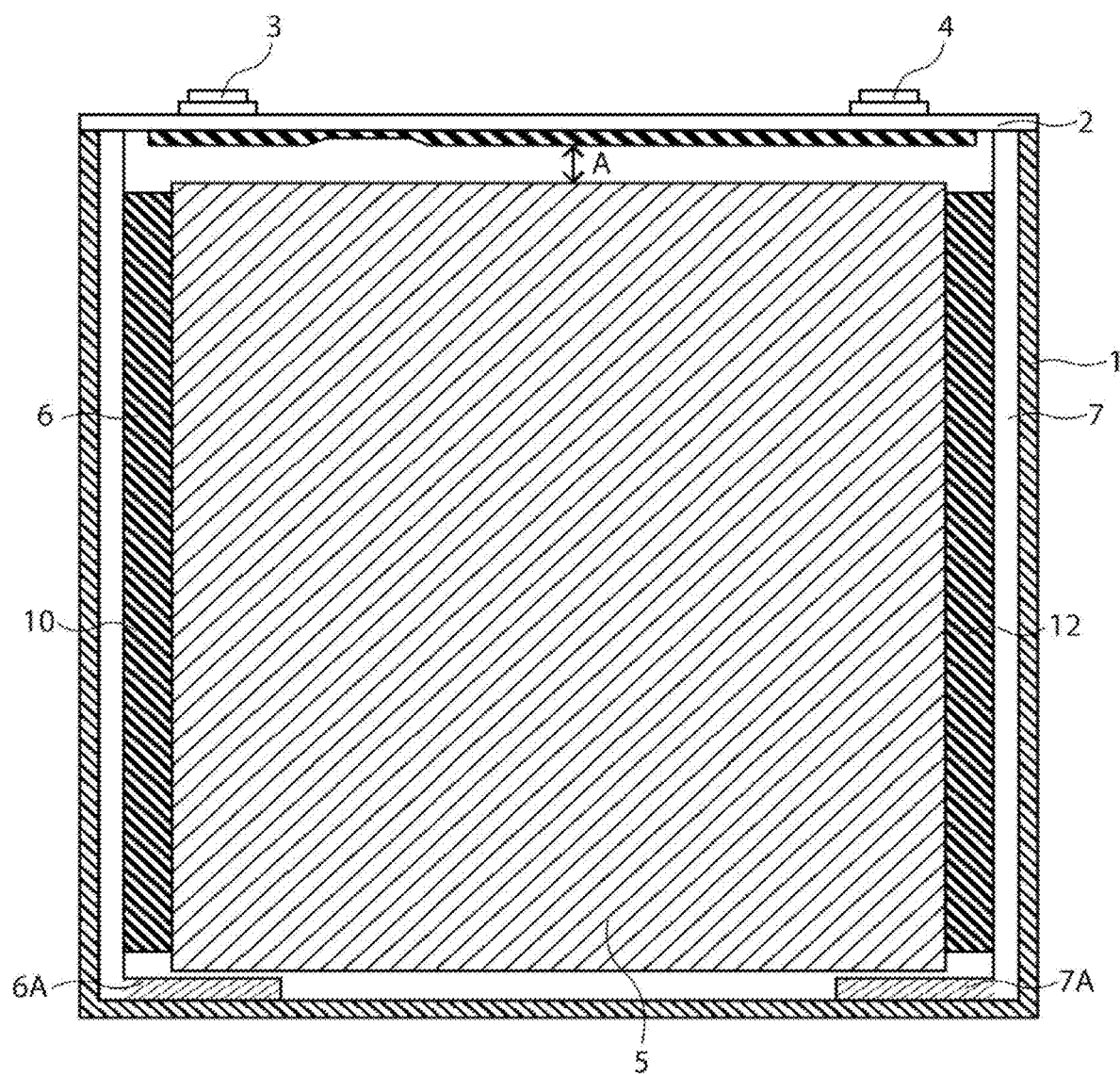
FIG. 6 is a partial schematic view of the secondary battery according to the first embodiment.

FIG. 6 is a partial schematic view of the secondary battery 100 as viewed in the direction A in the perspective view in FIG. 3 in a case in which the side of the lid 2 facing the wound electrode group 5 includes the insulating layer 2A. The difference from FIG. 5 is that the lid 2 includes the insulating layer 2A and that the distance between the insulating layer 2A and the wound electrode group 5 is the distance A. The preferable ranges of $A_{MIN}$, $A_{AVE}$, and $A_{MAX}$ and the reason are the same as those mentioned above.

Figure 7:
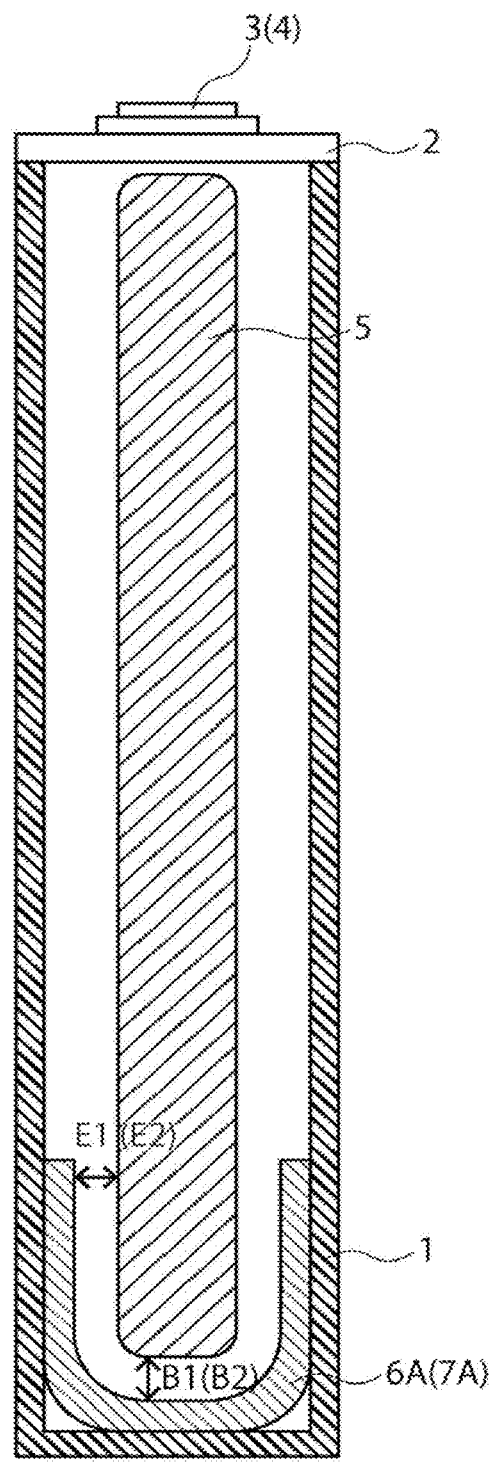
FIG. 7 is a schematic cross-sectional view of the secondary battery according to the first embodiment.

FIG. 7 is a schematic view of the cross section along B in FIG. 2. FIG. 7 is a partial cross-sectional view of the secondary battery 100. FIG. 7 is the cross-section at the position of B in FIG. 2 including the positive electrode terminal 3, and the cross-section may be a surface located further on a side provided with the positive electrode current collector tab 10 than the half of the width of the wound electrode group 5 and including the power generation element and the extending portion 6A of the positive electrode side internal insulating part 6. A distance between the extending portion 6A of the positive electrode side internal insulating part 6 and the outermost insulating film 13 of the power generation element in a direction from the bottom surface of the exterior material 1 toward the lid 2 is B1. Also, a distance between the extending portion 7A of the negative electrode side Internal insulating part 7 and the outermost insulating film 13 of the power generation element in the direction from the bottom surface of the exterior material 1 toward the lid 2 is B2. As for the distances B1 and B2, a cross-sectional image as illustrated in FIG. 7 is captured in a similar manner to that for the distance A, and a distance B is measured at 5-mm intervals. Subsequently, among the measured distances, a minimum distance, a maximum distance, and an average distance are derived.

Here, when the minimum distance of the distance B1 is $B1_{MIN}$, and the minimum distance of the distance B2 is $B2_{MIN}$, 0.5 mm<$B1_{MIN}$ and 1.0 mm<$B2_{MIN}$ are preferably satisfied. In a case in which the extending portion 6A of the positive electrode side internal insulating part 6 or the extending portion 7A of the negative electrode side Internal insulating part 7 and the wound electrode group 5 are in contact with each other, the wound electrode group 5 and the extending portion 6A of the positive electrode side internal insulating part 6 or the extending portion 7A of the negative electrode side internal insulating part 7 easily rub against each other even with a slight vibration. Also, in a case in which $B1_{MIN}$ is equal to or less than 0.5 mm, and in which $B2_{MIN}$ is equal to or less than 1.0 mm, the extending portion 6A of the positive electrode side internal insulating part 6 or the extending portion 7A of the negative electrode side internal insulating part 7 and the wound electrode group 5 are likely to come into contact with each other even with a small vibration, and the wound electrode group 5 and the extending portion 6A of the positive electrode side internal insulating part 6 or the extending portion 7A of the negative electrode side internal insulating part 7 are easily damaged, which is not preferable. Also, $B1_{MIN}$ and $B2_{MIN}$ preferably satisfy $B1_{MIN}$<2.0 mm and $B2_{MIN}$<2.0 mm. In a case in which each of $B1_{MIN}$ and $B2_{MIN}$ is equal to or more than 2.0 mm, the wound electrode group 5 moves over a wide range at the time of a large vibration, and the wound electrode group 5 and the lid 2 are thus easily damaged, which is not preferable. Therefore, when $B1_{MIN}$ and $B2_{MIN}$ satisfy 0.5 mm<$B1_{MIN}$<2.0 mm and 1.0 mm<$B2_{MIN}$<2.0 mm, the movable range of the wound electrode group 5 on the bottom side of the exterior material 1 is neither narrow nor wide, and the possibility of damage of the wound electrode group 5 or the wound electrode group 5 and the lid 2 caused by a vibration can thus be reduced. For a similar reason, $B1_{MIN}$ and $B2_{MIN}$ more preferably satisfy 0.5 mm<$B1_{MIN}$<1.0 mm and 1.0 mm<$B2_{MIN}$<1.5 mm.

Also, when the average value of the distance B1 is $B1_{AVE}$, 0.5 mm<$B1_{AVE}$<2.0 mm is more preferably satisfied for the same reason as the above. Further, when the maximum distance of the distance B1 is $B1_{MAX}$, $B1_{MAX}$<2.0 mm is more preferably satisfied for the same reason as the above. That is, $B1_{MIN}$ and $B1_{AVE}$ preferably satisfy 0.5 mm<$B1_{MIN}$ ($B1_{MIN}$<2.0 mm) and 0.5 mm<$B1_{AVE}$<2.0 mm, or $B1_{MIN}$ and $B1_{MAX}$ preferably satisfy 0.5 mm<$B1_{MIN}$ ($B1_{MIN}$<2.0 mm) and $B1_{MAX}$<2.0 mm. $B1_{MIN}$, $B1_{AVE}$, and $B1_{MAX}$ more preferably satisfy 0.5 mm<$B1_{MIN}$, 0.5 mm<$B1_{AVE}$<2.0 mm, and $B1_{MAX}$<2.0 mm.

Also, when the average value of the distance B2 is $B2_{AVE}$, 1.0 mm<$B2_{AVE}$<2.0 mm is more preferably satisfied for the same reason as the above. Further, when the maximum distance of the distance B2 is $B2_{MAX}$, $B2_{MAX}$<2.0 mm is more preferably satisfied for the same reason as the above. That is, 1.0 mm<$B2_{MIN}$ ($B2_{MIN}$<2.0 mm) and 1.0 mm<$B2_{AVE}$<2.0 mm are preferably satisfied, or 1.0 mm<$B2_{MIN}$ and $B2_{MAX}$<2.0 mm are preferably satisfied. 1.0 mm<$B2_{MIN}$ ($B1_{MIN}$<2.0 mm), 1.0 mm<$B2_{AVE}$<2.0 mm, and $B2_{MAX}$<2.0 mm are more preferably satisfied.

Also, although the direction of the distance is limited in the distance B, the same applies to a distance the direction of which is not limited. When a distance between the extending portion 6A of the positive electrode side internal insulating part 6 and the outermost insulating film 13 of the power generation element is E1, and a distance between the extending portion 7A of the negative electrode side internal insulating part 7 and the outermost insulating film 13 of the power generation element is E2, the distances E1 and E2 preferably satisfy the same ranges of the minimum distance, the average distance value, and the maximum distance as those for the distances B1 and B2. The direction of each of the distance E1 and the distance E2 is not limited to the direction from the bottom surface of the exterior material 1 to the lid 2 but includes any direction. The reason for being preferable is the same as that for the distance B ($B1_{MIN}$, $B2_{MIN}$, $B1_{MAX}$, $B2_{MAX}$, $B1_{AVE}$, and $B2_{AVE}$).

Figure 8:
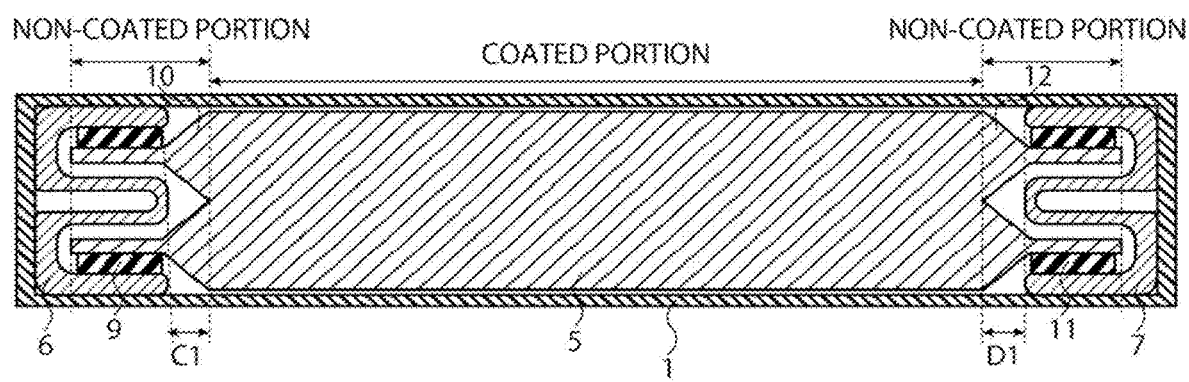
FIG. 8 is a schematic cross-sectional view of the secondary battery according to the first embodiment.
Figure 9:
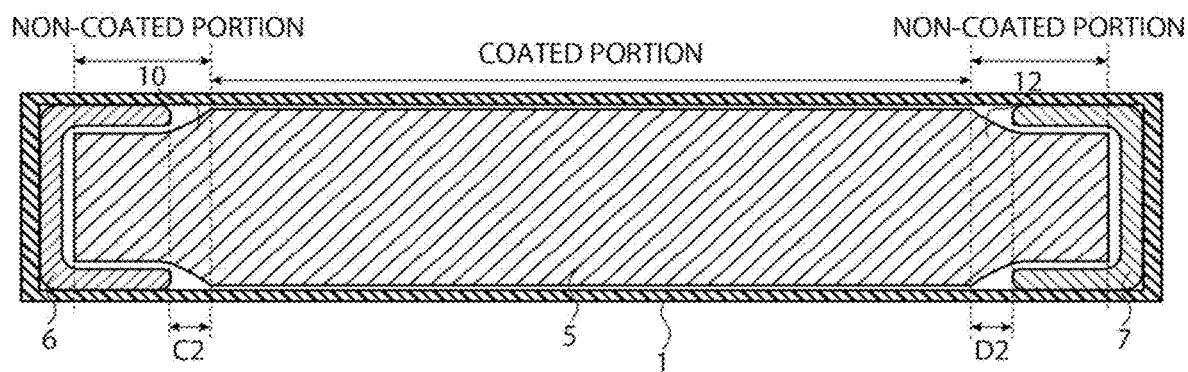
FIG. 9 is a schematic cross-sectional view of the secondary battery according to the first embodiment.

FIG. 8 is a schematic view of the cross section along C1 in FIG. 2. FIG. 9 is a schematic view of the cross section along C2 in FIG. 2. FIGS. 8 and 9 are cross-sectional views of the secondary battery 100. FIG. 8 is a cross section at the position of C1 including the positive electrode lead 9 and the negative electrode lead 11. FIG. 9 is a cross section located further on the bottom side of the exterior material 1 than the cross-section in FIG. 8 and not including the positive electrode lead 9 and the negative electrode lead 11.

A distance between a boundary point between the positive electrode active material layer 15 and the positive electrode current collector tab 10 in the wound electrode group 5 and the positive electrode side internal insulating part 6 in a direction from the negative electrode side internal insulating part 7 to the positive electrode side internal insulating part 6 on the cross-section in FIG. 8 is C1. Similarly to FIG. 8, a distance between a boundary point between the positive electrode active material layer 15 and the positive electrode current collector tab 10 in the wound electrode group 5 and the positive electrode side internal insulating part 6 in the direction from the negative electrode side internal insulating part 7 to the positive electrode side internal insulating part 6 on the cross-section in FIG. 9 is C2. Since the distance C1 and the distance C2 are both the distances between the same objects, each of both the distance C1 and the distance C2 is referred to as a distance C. As for the distance C, a cross-sectional image as illustrated in FIG. 8 or 9 is captured in a similar manner to that for the distance A. A cross-sectional image is captured at 5-mm intervals in a direction from the side provided with the lid 2 toward the bottom of the exterior material 1. The distance C is measured from the captured cross-sectional image. Subsequently, among the measured distances, a minimum distance, a maximum distance, and an average distance are derived.

A distance between a boundary point between the negative electrode active material layer 19 and the negative electrode current collector tab 12 and the negative electrode side internal insulating part 7 in a direction from the positive electrode side internal insulating part 6 to the negative electrode side internal insulating part 7 on the cross-section in FIG. 8 is D1. Similarly to FIG. 8, a distance between a boundary point between the negative electrode active material layer 19 and the negative electrode current collector tab 12 and the negative electrode side internal insulating part 7 in the direction from the positive electrode side internal insulating part 6 to the negative electrode side internal insulating part 7 on the cross-section in FIG. 9 is D2. Since the distance D1 and the distance D2 are both the distances between the same objects, each of both the distance D1 and the distance D2 is referred to as a distance D. As for the distance D, a cross-sectional image as illustrated in FIG. 8 or 9 is captured in a similar manner to that for the distance A. A cross-sectional image is captured at 5-mm intervals in a direction from the side provided with the lid 2 toward the bottom of the exterior material 1. The distance D is measured from the captured cross-sectional image. Subsequently, among the measured distances, a minimum distance, a maximum distance, and an average distance are derived.

When the minimum distance of the distance C is $C_{MIN}$, and the minimum distance of the distance D is $D_{MIN}$, $C_{MIN}$ and $D_{MIN}$ preferably satisfy 1.0 mm<$C_{MIN}$<4.0 mm and 1.0 mm<$D_{MIN}$<4.0 mm. In a case in which each of $C_{MIN}$ and $D_{MIN}$ is equal to or less than 1.0 mm, the movable range of the wound electrode group 5 in the direction from the positive electrode side internal insulating part 6 to the negative electrode side internal insulating part 7 or in the direction from the positive electrode side internal insulating part 6 to the negative electrode side internal insulating part 7 is narrow, the positive electrode current collector tab 10 easily rubs against the positive electrode side internal insulating part 6, and the negative electrode current collector tab 12 easily rubs against the negative electrode side internal insulating part 7, which is not preferable. Also, in a case in which each of $C_{MIN}$ and $D_{MIN}$ is equal to or more than 4.0 mm, the movable range of the wound electrode group 5 in the direction from the positive electrode side internal insulating part 6 to the negative electrode side internal insulating part 7 or in the direction from the positive electrode side internal insulating part 6 to the negative electrode side internal insulating part 7 is wide, the impact when the positive electrode current collector tab 10 contacts the positive electrode side internal insulating part 6 is large, the current collector tab is easily damaged, the impact when the negative electrode current collector tab 12 contacts the negative electrode side internal insulating part 7 is large, and the current collector tab is easily damaged, which is not preferable. For a similar reason to the above, $C_{MIN}$ and $D_{MIN}$ more preferably satisfy 1.0 mm<$C_{MIN}$<2.0 mm and 1.0 mm<$D_{MIN}$<2.0 mm.

Figure 10:
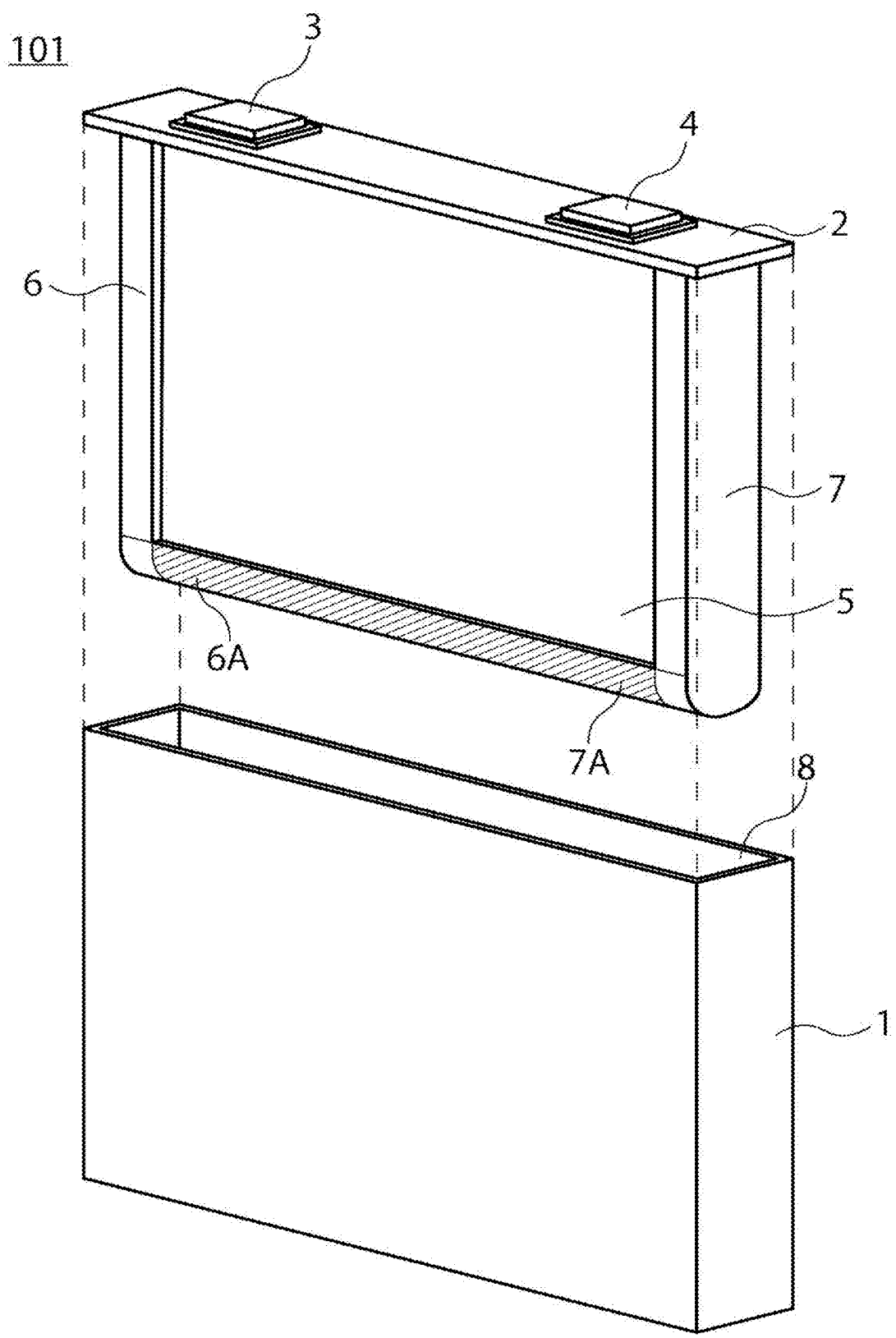
FIG. 10 is a schematic exploded perspective view of the secondary battery according to the first embodiment.

FIG. 10 is a schematic exploded perspective view of a secondary battery 101 according to the first embodiment. The secondary battery 101 in FIG. 10 differs from the secondary battery 100 illustrated in FIG. 2 in that the extending portion 6A of the positive electrode side internal insulating part 6 and the extending portion 7A of the negative electrode side internal insulating part 7 are connected. When the extending portion 6A of the positive electrode side internal insulating part 6 and the extending portion 7A of the negative electrode side internal insulating part 7 are connected, the boundary between the distance C and the distance D is the center of the wound electrode group 5.

Second Embodiment

Hereinbelow, an embodiment will be described with reference to the drawings. A battery module according to a second embodiment includes one or more secondary batteries (that is, single batteries) according to the first embodiment. In a case in which a battery module includes a plurality of single batteries, the single batteries are electrically connected and arranged in series, in parallel, or in series and in parallel.

Figure 11:
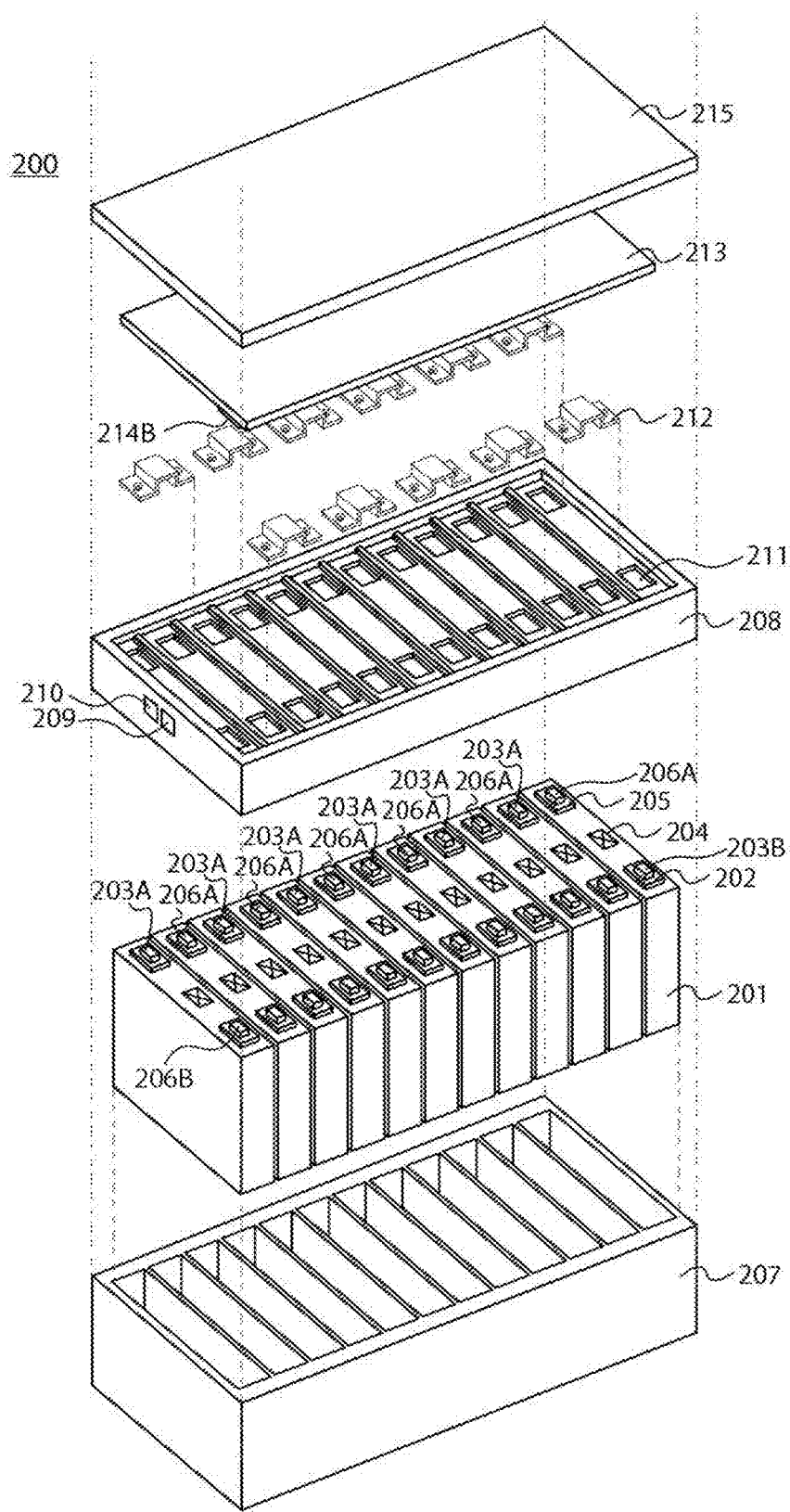
FIG. 11 is a schematic cross-sectional view of a battery module according to a second embodiment.
Figure 12:
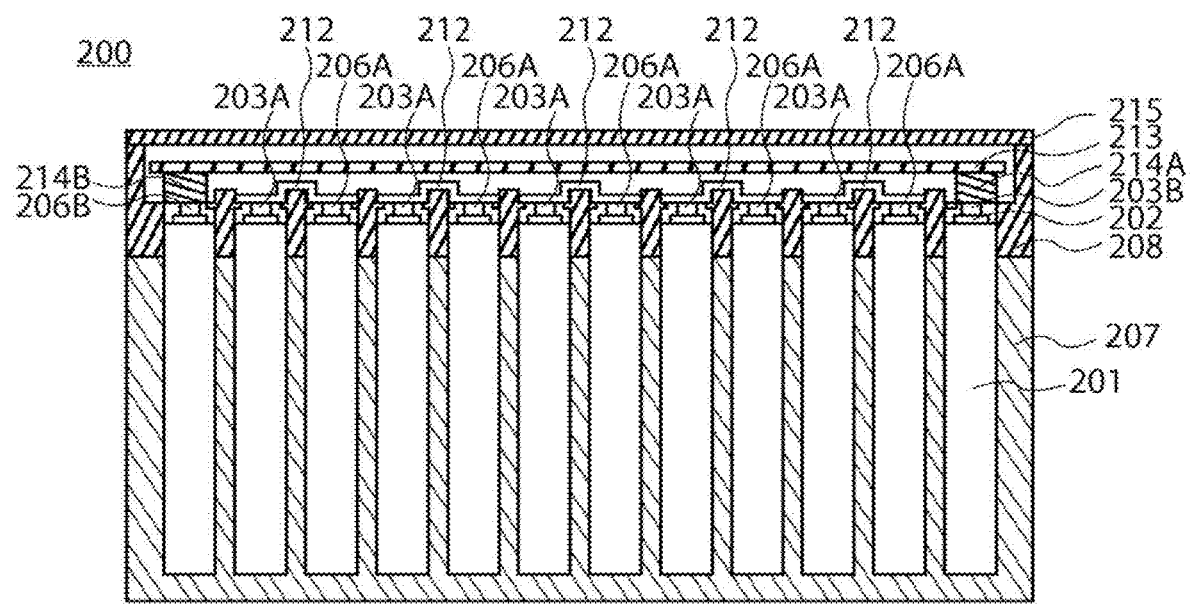
FIG. 12 is an exploded perspective view of the battery module according to the second embodiment.

A battery module 200 will specifically be described with reference to the exploded perspective view in FIG. 11 and the cross-sectional view in FIG. 12. In the battery module 200 illustrated in FIG. 11, the secondary battery 100 illustrated in FIG. 1 is used as each single battery 201. The cross-sectional view in FIG. 12 illustrates a cross-section including positive electrode terminals 203B and negative electrode terminals 206B in the exploded perspective view in FIG. 11.

Each of the plurality of single batteries 201 includes outside the exterior can of the battery a positive electrode terminal 203 (203A and 203B) provided on a positive electrode gasket 202, a safety valve 204, and a negative electrode terminal 206 (206A and 206B) provided on a negative electrode gasket 205. The single batteries 201 illustrated in FIG. 11 are arranged to be arrayed alternately. Although the single batteries 201 illustrated in FIG. 12 are connected in series, the single batteries 201 may be connected in parallel by changing the arrangement method.

The single batteries 201 are housed in a lower case 207 and an upper case 208. The upper case 208 is provided with power supply input/output terminals 209 and 210 (positive electrode terminal 209 and negative electrode terminal 210) of the battery module. The upper case 208 is provided with opening portions 211 to be aligned with the positive electrode terminals 203 and the negative electrode terminals 206 of the single batteries 201, and the positive electrode terminals 203 and the negative electrode terminals 206 are exposed from the opening portions 211. The exposed positive electrode terminal 203A is connected to the negative electrode terminal 206A of an adjacent single battery 201 by a bus bar 212, and the exposed negative electrode terminal 206A is connected to the positive electrode terminal 203A of an adjacent single battery 201 on the opposite side of the adjacent single battery 201 by the bus bar 212. The positive electrode terminal 203B not connected by the bus bar 212 is connected to a positive electrode terminal 214A provided on a substrate 213, and the positive electrode terminal 214A is connected to the positive electrode power supply input/output terminal 209 via a circuit on the substrate 213. Also, the negative electrode terminal 206B not connected by the bus bar 212 is connected to a negative electrode terminal 214B provided on the substrate 213, and the negative electrode terminal 214B is connected to the negative electrode power supply input/output terminal 210 via the circuit on the substrate 213. The power supply input/output terminals 209 and 210 are connected to a not-illustrated charging power supply and load to cause the battery module 200 to be charged and used. The upper case 208 is sealed with a lid 215. The substrate 213 is preferably provided with a charge/discharge protection circuit. Also, a configuration in which information such as deterioration of the single battery 201 can be output from a not-illustrated terminal may appropriately be added. A battery module excellent in vibration resistance is provided by using the secondary battery 100 or the secondary battery 101 according to the embodiment.

Third Embodiment

Figure 13:
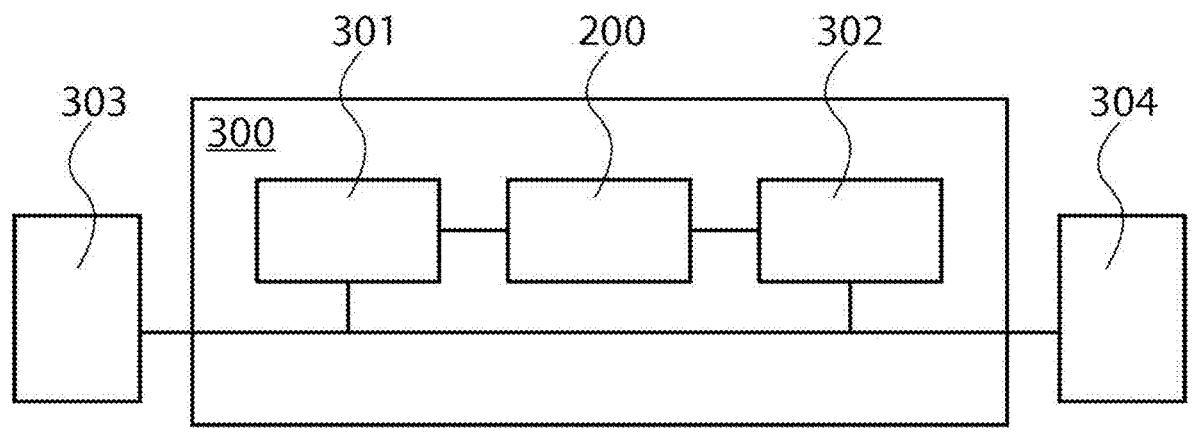
FIG. 13 is a schematic view of a storage battery according to a third embodiment.

The battery module according to the embodiment can be mounted on a power storage device 300. The power storage device 300 illustrated in the schematic view in FIG. 13 includes the battery module 200, an inverter 302, and a converter 301. The power storage device 300 has a configuration in which current from an external alternating current power supply 303 is converted into direct current by the converter 301, in which the battery module is charged, in which the direct current from the battery module is converted into alternating current by the inverter 302, and in which electricity is supplied to a load 304. By providing the power storage device 300 having the present configuration including the battery module 200 according to the embodiment, a power storage device excellent in vibration resistance is provided.

Fourth Embodiment

Figure 14:
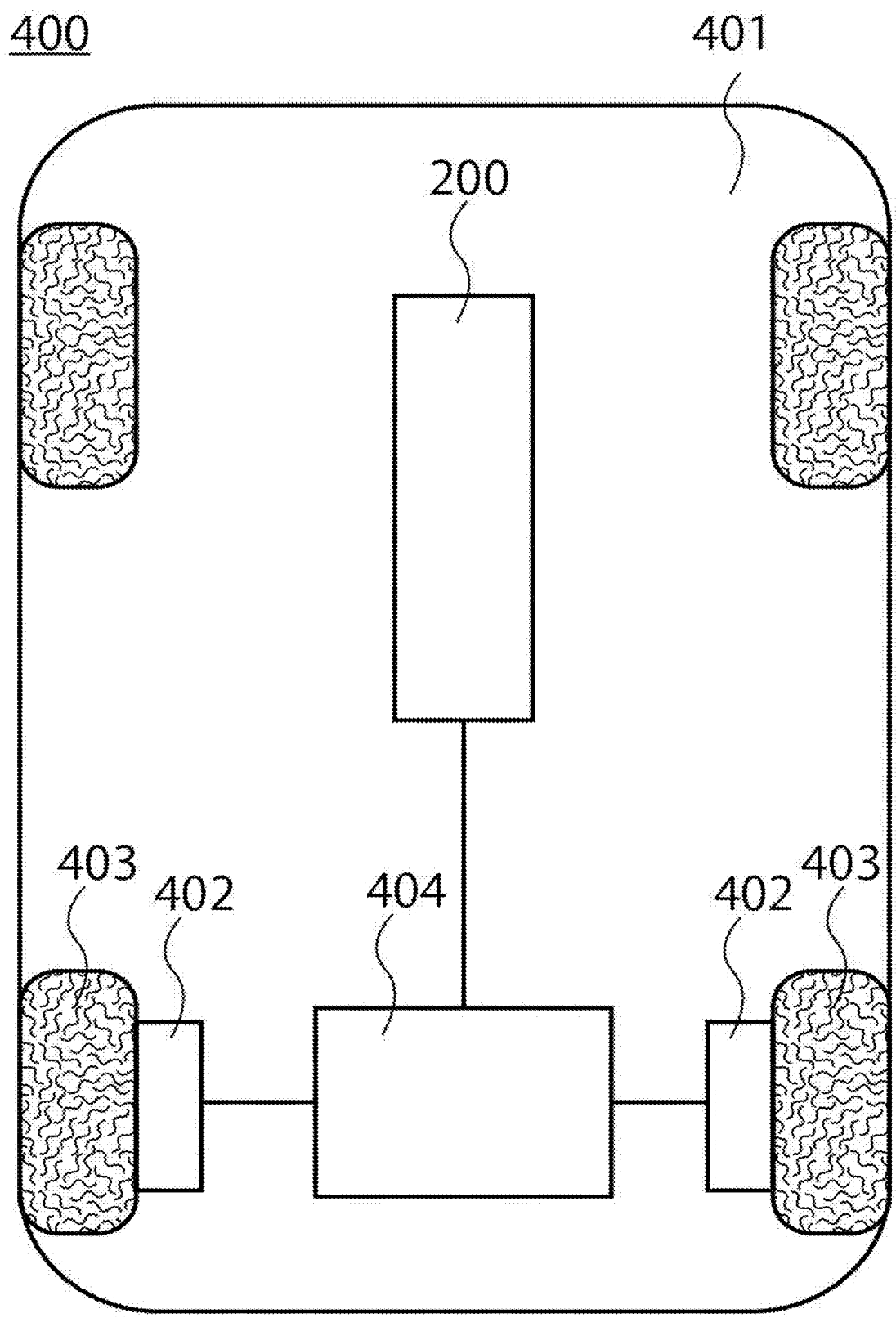
FIG. 14 is a schematic view of a vehicle according to a fourth embodiment.

The battery module 200 according to the embodiment can be mounted on a vehicle 400. The vehicle 400 illustrated in the schematic view in FIG. 14 includes at least the battery module 200, an inverter 401, a motor 402, and wheels 403. Direct current from the battery module 200 is converted into alternating current by the inverter, and the motor 402 is driven by the alternating current. In a case of using a motor driven by direct current, the Inverter is omitted. In the figure, a charging mechanism and the like for the battery module are omitted. The wheels 603 can be rotated by a driving force of the motor 402. The vehicle 400 includes an electric vehicle such as a train and a hybrid vehicle having another driving source such as an engine. The battery module 200 may be charged with use of regeneration energy from the motor 402. What is driven by the electric energy from the battery module is not limited to the motor, and the battery module may be used as a power source for operating a not-illustrated electric device of the vehicle 400. By providing the vehicle 400 having the present configuration including the battery module 200 according to the embodiment, a vehicle excellent in vibration resistance is provided.

Fifth Embodiment

Figure 15:
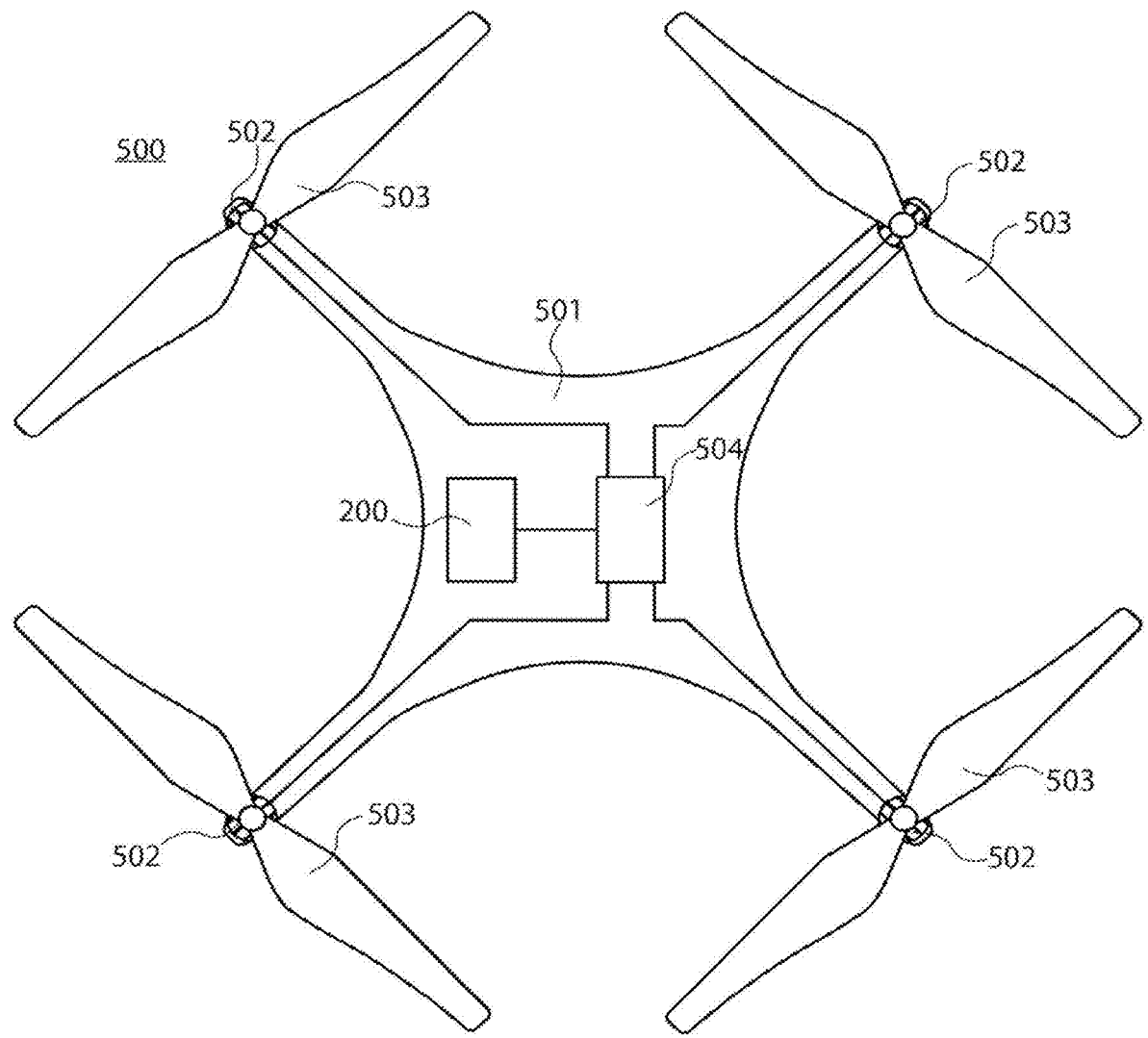
FIG. 15 is a schematic view of a flying object according to a fifth embodiment.

A fifth embodiment relates to a flying object (for example, a multicopter). The flying object according to the fifth embodiment uses the battery module 200 according to the second embodiment. A configuration of the flying object according to the present embodiment will briefly be described with reference to the schematic view of a flying object (quadcopter) 500 in FIG. 15. The flying object 500 includes the battery module 200, a body framework 501, a motor 502, a rotary wing 503, and a control unit 504. The battery module 200, the motor 502, the rotary wing 503, and the control unit 504 are arranged on the body framework 501. The control unit 504 converts power output from the battery module 200 and adjusts the output. The motor 502 rotates the rotary wing 503 with use of the power output from the battery module 200. By providing the flying object 500 having the present configuration including the battery module 200 according to the embodiment, a flying object excellent in battery characteristics is provided.

Hereinafter, the secondary battery according to the embodiment will be described more specifically by examples.

Example 1

The secondary battery illustrated in the first embodiment was manufactured so as to satisfy $A_{MIN}$, $B1_{MIN}$, $B2_{MIN}$, $C_{MIN}$, and $D_{MIN}$ illustrated in Table 1 below, and a resistance change rate of the wound electrode group 5 before and after vibration application was measured. Table 1 also illustrates the resistance change rate ([resistance after vibration application]/[resistance before vibration application]×100).

Example 2

A secondary battery was manufactured in a similar manner to Example 1 so as to satisfy the conditions in Table 1, and a resistance change rate of the wound electrode group 5 before and after vibration application in Example 2 was measured.

Comparative Example 1

A secondary battery was manufactured in a similar manner to Example 1 so as to satisfy the conditions in Table 1, and a resistance change rate of the wound electrode group 5 before and after vibration application in Comparative Example 1 was measured.

Comparative Example 2

A secondary battery was manufactured in a similar manner to Example 1 so as to satisfy the conditions in Table 1, and a resistance change rate of the wound electrode group 5 before and after vibration application in Comparative Example 2 was measured.

TABLE 1

| | $A_{MIN}$ (mm) | $B1_{MIN}$ (mm) | $B2_{MIN}$ (mm) | $C_{MIN}$ (mm) | $D_{MIN}$ (mm) | RESISTANCE CHANGE RATE |
|---|---|---|---|---|---|---|
| EXAMPLE 1 | 0.6 | 0.6 | 1.2 | 1.5 | 1.5 | 100 |
| EXAMPLE 2 | 0.9 | 0.9 | 1.4 | 1.9 | 1.9 | 104 |
| COMPARATIVE EXAMPLE 1 | 2.5 | 2.5 | 3.0 | 1.5 | 1.5 | 240 |
| COMPARATIVE EXAMPLE 2 | 0.6 | 0.6 | 1.2 | 3.0 | 3.0 | 120 |

As illustrated in Table 1, it has been confirmed that, in a case in which the distance between the wound electrode group and the lid or the like is within a preferable range, damage to the wound electrode group due to vibration is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
an exterior material including an opening portion and including a bottom;
a wound electrode group housed in the exterior material in order for an insertion direction to be perpendicular to a winding axis;
a lid attached to the opening portion of the exterior material and including at least a plate-like member, a positive electrode terminal, and a negative electrode terminal;
a positive electrode lead connected to the positive electrode terminal and the positive electrode current collector tab;
a negative electrode lead connected to the negative electrode terminal and the negative electrode current collector tab;
a positive electrode side internal insulating part covering the positive electrode current collector tab, the positive electrode lead, and at least a part of the wound electrode group on the bottom side of the exterior material; and
a negative electrode side internal insulating part covering the negative electrode current collector tab, the negative electrode lead, and at least a part of the wound electrode group on the bottom side of the exterior material,
wherein, when a minimum distance between the lid and the wound electrode group is $A_{MIN}$,
0.5 mm<$A_{MIN}$<2.0 mm is satisfied,
the wound electrode group includes a power generation element in which a positive electrode current collector, a positive electrode active material layer, a separator, a negative electrode active material layer, and a negative electrode current collector are at least laminated in this order and wound, a positive electrode current collector tab formed by winding the positive electrode current collector at a first end of the wound power generation element, and a negative electrode current collector tab formed by winding the negative electrode current collector at a second end of the power generation element,
an outermost periphery of the power generation element is wound with an insulating film,
the exterior material further includes an electrolyte inside of the exterior material,
the positive electrode side internal insulating part includes an extending portion extending in a direction of the negative electrode side internal insulating part on the bottom side of the exterior material,
the negative electrode side internal insulating part includes an extending portion extending in a direction of the positive electrode side internal insulating part on the bottom side of the exterior material,
when a minimum distance between the extending portion of the positive electrode side internal insulating part and the outermost insulating film of the power generation element in a direction from the bottom surface of the exterior material toward the lid is $B1_{MIN}$, and
when a minimum distance between the extending portion of the negative electrode side internal insulating part and the outermost insulating film of the power generation element in a direction from the bottom surface of the exterior material toward the lid is $B2_{MIN}$,
0.5 mm<$B1_{MIN}$<2.0 mm and 1.0 mm<$B2_{MIN}$<2.0 mm are satisfied, and
a distance between a lid side of the positive electrode side internal insulating part and a lid side of the negative electrode side internal insulating part is longer than a distance between a bottom side of the positive electrode side internal insulating part and a bottom side of the negative electrode side internal insulating part.

2. The secondary battery according to claim 1, wherein, when a minimum distance between a boundary between the positive electrode active material layer and the positive electrode current collector tab and a portion of the positive electrode side internal insulating part excluding of the extending portion in a direction from the negative electrode side internal insulating part to the positive electrode side internal insulating part is $C_{MIN}$, and when a minimum distance between a boundary between the negative electrode active material layer and the negative electrode current collector tab and a portion of the negative electrode side internal insulating part excluding of the extending portion in a direction from the positive electrode side internal insulating part to the negative electrode side internal insulating part is $D_{MIN}$, 1.0 mm<$C_{MIN}$<4.0 mm and 1.0 mm<$D_{MIN}$<4.0 mm are satisfied.

3. The secondary battery according to claim 2, wherein the $C_{MIN}$ and the $D_{MIN}$ satisfy 1.0 mm<$C_{MIN}$<2.0 mm and 1.0 mm<$D_{MIN}$<2.0 mm.

4. The secondary battery according to claim 1, wherein the extending portion of the positive electrode side internal insulating part and the extending portion of the negative electrode side internal insulating part are connected.

5. The secondary battery according to claim 1, wherein the AMIN satisfies 0.5 mm<$A_{MIN}$<1.0 mm.

6. The secondary battery according to claim 1, wherein the $B1_{MIN}$ and the $B2_{MIN}$ satisfy 0.5 mm<$B1_{MIN}$<1.0 mm and 1.0 mm<$B2_{MIN}$<1.5 mm.

7. The secondary battery according to claim 1, wherein the lid further includes an insulating layer on a surface facing the wound electrode group, and the $A_{MIN}$ is a distance between the insulating layer of the lid and the wound electrode group.

8. A battery module using the secondary battery according to any one of claims 1.

9. A vehicle using the battery module according to claim 8.

10. A flying object using the battery module according to claim 8.

11. The secondary battery according to claim 1, wherein the extending portion of the positive electrode side internal insulating part partly covers the power generation element, the extending portion of the negative electrode side internal insulating part partly covers the power generation element.

12. The secondary battery according to claim 1, wherein the extending portion of the positive electrode side internal insulating part partly covers the power generation element, the extending portion of the negative electrode side internal insulating part partly covers the power generation element, a portion of the positive electrode side internal insulating part excluding of the extending portion covers the positive electrode current collector tab and does not cover the power generation element, and a portion of the negative electrode side internal insulating part excluding of the extending portion covers the negative electrode current collector tab and does not cover the power generation element.

* * * * *